United States Patent
Aio et al.

(10) Patent No.: US 12,273,203 B2
(45) Date of Patent: Apr. 8, 2025

(54) COMMUNICATION DEVICE AND COMMUNICATION METHOD

(71) Applicant: Sony Group Corporation, Tokyo (JP)

(72) Inventors: Kosuke Aio, Tokyo (JP); Yusuke Tanaka, Tokyo (JP); Ryuichi Hirata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 245 days.

(21) Appl. No.: 17/921,973

(22) PCT Filed: Mar. 12, 2021

(86) PCT No.: PCT/JP2021/010116
§ 371 (c)(1),
(2) Date: Oct. 28, 2022

(87) PCT Pub. No.: WO2021/225034
PCT Pub. Date: Nov. 11, 2021

(65) Prior Publication Data
US 2023/0179340 A1    Jun. 8, 2023

(30) Foreign Application Priority Data

May 7, 2020   (JP) ................. 2020-082265

(51) Int. Cl.
*H04L 1/1829*   (2023.01)
(52) U.S. Cl.
CPC .......... *H04L 1/1835* (2013.01); *H04L 1/1864* (2013.01)

(58) Field of Classification Search
CPC ................. H04L 1/1835; H04L 1/1864; H04L 1/1614; H04L 1/1635; H04L 1/1685;
(Continued)

(56) References Cited

U.S. PATENT DOCUMENTS

| 2018/0205502 A1 | 7/2018 | Merlin |
| 2019/0364555 A1 | 11/2019 | Huang |

(Continued)

FOREIGN PATENT DOCUMENTS

JP    2017-28746 A    2/2017

OTHER PUBLICATIONS

International Search Report and Written Opinion mailed on May 18, 2021, received for PCT Application PCT/JP2021/010116, filed on Mar. 12, 2021, 7 pages including English Translation.

(Continued)

*Primary Examiner* — Kan Yuen
(74) *Attorney, Agent, or Firm* — XSENSUS LLP

(57) ABSTRACT

A communication device that performs wireless communication using a plurality of links includes a common data processing unit that includes a common storage unit of a cache type storing success/failure of acquisition of packets received on the plurality of links, and that performs common data processing on packets received on individual links, and a control unit that controls transmission of a response signal to the packets received. The control unit generates a common response signal including acquisition success/failure information received on the plurality of links on the basis of acquisition success/failure information held in the common storage.

5 Claims, 29 Drawing Sheets

(58) Field of Classification Search
CPC ............... H04L 1/1607; H04L 5/0055; H04W 28/0858; H04W 28/0867; H04W 28/0958; H04W 76/19; H04W 76/15; H04W 84/12; H04W 28/04

See application file for complete search history.

(56) References Cited

U.S. PATENT DOCUMENTS

| | | | | |
|---|---|---|---|---|
| 2020/0037288 | A1* | 1/2020 | Huang | H04W 72/30 |
| 2020/0119863 | A1* | 4/2020 | Nakanishi | H04L 1/22 |
| 2021/0083805 | A1* | 3/2021 | Kneckt | H04L 1/1642 |
| 2021/0111836 | A1* | 4/2021 | Huang | H04L 1/1642 |
| 2021/0211235 | A1* | 7/2021 | Chu | H04L 1/1614 |
| 2021/0212142 | A1* | 7/2021 | Patil | H04L 1/1614 |
| 2022/0272777 | A1* | 8/2022 | Guo | H04L 1/1621 |
| 2022/0322473 | A1* | 10/2022 | Hwang | H04W 76/15 |
| 2022/0385403 | A1* | 12/2022 | Song | H04W 76/15 |
| 2023/0006773 | A1* | 1/2023 | Dong | H04L 1/1896 |
| 2023/0011167 | A1* | 1/2023 | Chitrakar | H04W 76/15 |
| 2023/0117751 | A1* | 4/2023 | Kneckt | H04W 80/02 370/329 |

OTHER PUBLICATIONS

Chitrakar et al., "Multi-link Block Ack Architecture", doc.: IEEE 802.11-20/0055r1, Jan. 10, 2020, 11 pages.

Song et al., "Multi-link Acknowledgment", doc.: IEEE 802.11-19/1887r3, Nov. 11, 2019, 16 pages.

Chitrakar et al., "Multi-link Block Ack Architecture", doc.: IEEE 802.11-20/0055r0, Jan. 10, 2020, 11 pages.

Rojan Chitrakar (Panasonic), Multi-link block ack architecture, IEEE802.11-20/0055r2 , IEEE, Jan. 10, 2020.

* cited by examiner

COMMUNICATION DEVICE AND COMMUNICATION METHOD

CROSS-REFERENCE TO RELATED APPLICATIONS

The present application is based on PCT filing PCT/JP2021/010116, filed Mar. 12, 2021, which claims priority to JP 2020-082265, filed May 7, 2020, the entire contents of each of which are incorporated herein by reference.

TECHNICAL FIELD

The technology (hereinafter, "the present disclosure") disclosed in this specification relates to a communication device and a communication method that perform a multi-link operation.

BACKGROUND ART

In order to cope with an increase in data traffic in recent years, it is required to increase a data capacity and improve a peak throughput in a wireless local area network (LAN). As one solution, the multi-link operation (MLO) (see, for example, Patent Document 1) in which communication is performed by simultaneously using a plurality of frequency bands has attracted attention, and is expected to be standardized by the IEEE 802.11be, which is a next-generation standard of the IEEE 802.11.

In addition, an automatic repeat-request (ARQ) technique is known to achieve high reliability of data communication. That is, the data receiver returns a response signal including acquisition success/failure information of received data, and the data sender retransmits the data on the basis of the acquisition success/failure information extracted from the response signal. Normally, in a case where the communication terminal tries to make a response signal on a certain link, it is assumed that a response signal is generated in a media access control (MAC) block corresponding to the link in the communication terminal, and the response signal includes only acquisition success/failure information of data received on the corresponding link (in other words, data acquisition success/failure information on other links is not included). In such an assumption, for example, in a case where the data sender fails to receive the response signal on a certain link, even if the data receiver succeeds in receiving the data, the data sender determines that the data has not been correctly received, resulting in a waste that the data receiver transmits the already acquired data again.

Therefore, a scheme called Common Block Ack has been proposed as an ARQ scheme in the MLO (see, for example, Non-Patent Document 1). In this scheme, the data receiver transmits, to a data sender side, Common Block Ack that is a response signal including not only acquisition success/failure information of data received on the same link but also acquisition success/failure information of data received on other links. As a result, if the data sender fails to receive the response signal on a certain link, but succeeds in receiving the response signal on another link, the data sender can acquire the acquisition success/failure information of the data transmitted on the link in which the reception of the response signal has failed, and unnecessary retransmission can be prevented.

In the MLO, the sender may distribute data of the same traffic to a plurality of links and transmit the data. According to the Common Block Ack scheme, the receiver transmits a response signal in which data acquisition success/failure information in one Block Ack Session is collected. Therefore, if the sender fails to receive the individual response signal including the individual acquisition success/failure information for each link, but succeeds in receiving a common response signal in which the acquisition success/failure information in the entire Block Ack Sessions is collected, unnecessary retransmission can be prevented. Note that the Block Ack Session includes a combination of a sender (sender address) and a traffic (traffic identifier (TID)). In this specification, the combination of a sender and a TID is also referred to as "sender information".

Generally, on a data receiver side, a memory called "scoreboard" is used to store data acquisition success/failure information. In Non-Patent Document 1, in order to generate Common Block Ack, Common Scoreboard that stores acquisition success/failure information of data received on each link is used. However, in the proposal content described in Non-Patent Document 1, it is assumed that the Common Scoreboard manages acquisition success/failure information as a "Full-state" Common Scoreboard that allocates fixed memory area to each Block Ack Session (that is, to each combination of a sender and a traffic identifier (TID)), and it is necessary to mount an expensive memory having a large storage capacity, and thus there is a concern that the mounting difficulty level increases.

On the other hand, a "Partial-state" scoreboard is mainly used to store data acquisition success/failure information for each link. The Partial-state scoreboard is a so-called small capacity cache memory that temporarily stores acquisition success/failure information in at most one Block Ack Session. That is, in the Partial state scoreboard, a fixed memory area is not allocated to each Block Ack Session unlike the Full-state scoreboard, and when another Block Ack Session starts on the corresponding link, the Block Ack Session is overwritten.

If not the Full-state Common Scoreboard but the Partial-state Common Scoreboard performs management, the storage capacity can be reduced, and the mounting difficulty level can be alleviated. However, in the Partial-state Scoreboard, only storage of acquisition success/failure information in one Block Ack Session is guaranteed at most. For this reason, unless the update timing and conditions are specified, the Common Scoreboard is overwritten with information in another session, and thus, there may occur a problem that the Common Block Ack cannot be generated.

CITATION LIST

Patent Document

Patent Document 1: Japanese Patent Application Laid-Open No. 2017-28746

Non-Patent Document

Non-Patent Document 1: Public Contribution of IEEE 802.11 (20/0055 r0, Multi-link Block Ack Architecture)

SUMMARY OF THE INVENTION

Problems to be Solved by the Invention

An object of the present disclosure is to provide a communication device and a communication method for transmitting a common response signal including data acquisition success/failure information of a plurality of links.

Solutions to Problems

The present disclosure has been made in view of the above problems, and a first aspect thereof is a communication device that performs wireless communication using a plurality of links, the communication device including:

a common data processing unit that includes a common storage unit of a cache type storing success/failure of acquisition of packets received on the plurality of links, and that performs common data processing on packets received on individual links; and a control unit that controls transmission of a response signal to the packets received, in which the control unit generates a common response signal including acquisition success/failure information received on the plurality of links on the basis of acquisition success/failure information held in the common storage unit.

The communication device of the first aspect, further including an individual data processing unit that includes an individual storage unit scoring acquisition success/failure information of packets received on individual links, and that performs individual data processing on the packets received on the individual links.

The control unit performs update processing of the common storage unit on the basis of acquisition success/failure information related to same sender information stored in the common storage unit and the individual storage unit. That is, in a case where the individual storage unit stores acquisition success/failure information related to same sender information as the common storage unit, the control unit performs update processing of the common storage unit on the basis of acquisition success/failure information related to the same sender information stored in the individual storage unit.

Alternatively, the control unit performs update processing of the individual storage unit on the basis of acquisition success/failure information related to same sender information stored in the common storage unit and the individual storage unit.

In addition, a second aspect of the present disclosure is a communication method that performs wireless communication using a plurality of links, the communication method including:

a common data processing step of performing common data processing on packets received on individual links using a common storage unit of a cache type storing success/failure of acquisition of packets received on the plurality of links; and a control step of controlling transmission of a response signal to the packets received, in which in the control step, on the basis of acquisition success/failure information held in the common storage unit, a common response signal including acquisition success/failure information received on the plurality of links is generated.

Furthermore, a third aspect of the present disclosure is a communication device including:

a communication unit that performs wireless communication using a plurality of links; and a control unit that controls a wireless communication operation in the communication unit, in which when transmitting data signals on the plurality of links, the control unit provides notification of presence or absence of a request for a common response signal including acquisition success/failure information related to reception of data signals on the plurality of links.

Moreover, a fourth aspect of the present disclosure is a communication method that performs wireless communication using a plurality of links, the communication method including:

a step of providing notification of presence or absence of a request for a common response signal including acquisition success/failure information related to reception of data signals on the plurality of links and transmitting a data signal; and a step of receiving a response signal.

Effects of the Invention

According to the present disclosure, it is possible to provide the communication device and the communication method that transmit a common response signal using a common storage unit of a cache type that stores acquisition success/failure information of packets received on a plurality of links.

Note that the effects described in this specification are merely examples, and the effects brought by the present disclosure are not limited thereto. Furthermore, the present disclosure may further provide additional effects in addition to the above effects.

Still other objects, features, and advantages of the present disclosure will become apparent from a more detailed description based on embodiments to be described later and the accompanying drawings.

BRIEF DESCRIPTION OF DRAWINGS

FIG. 20 is a diagram illustrating a status of each scoreboard in the AP at the time of performing the communication sequence illustrated in FIG. 19.

FIG. 22 is a diagram illustrating a status of each scoreboard in the AP at the time of performing the communication sequence illustrated in FIG. 21.

FIG. 24 is a diagram illustrating a state of each scoreboard in the AP at the time of performing the communication sequence illustrated in FIG. 23.

FIG. 30 is a diagram illustrating a status of each scoreboard in the AP at the time of performing the communication sequence illustrated in FIG. 29.

MODE FOR CARRYING OUT THE INVENTION

Hereinafter, the technology according to the present disclosure will be described in the following order with reference to the drawings.
A. System Configuration
B. Device Configuration
C. Functional Configuration Example of MLD
D. Common Block Ack
E. First Example
  E-1. Overall Sequence
  E-2. Block Ack Setup Phase
  E-3. Data Transmission Phase
  E-4. Block Ack Request Phase
  E-5. Operation Example
F. Second Example
G. Effects

A. SYSTEM CONFIGURATION

Figure 1:
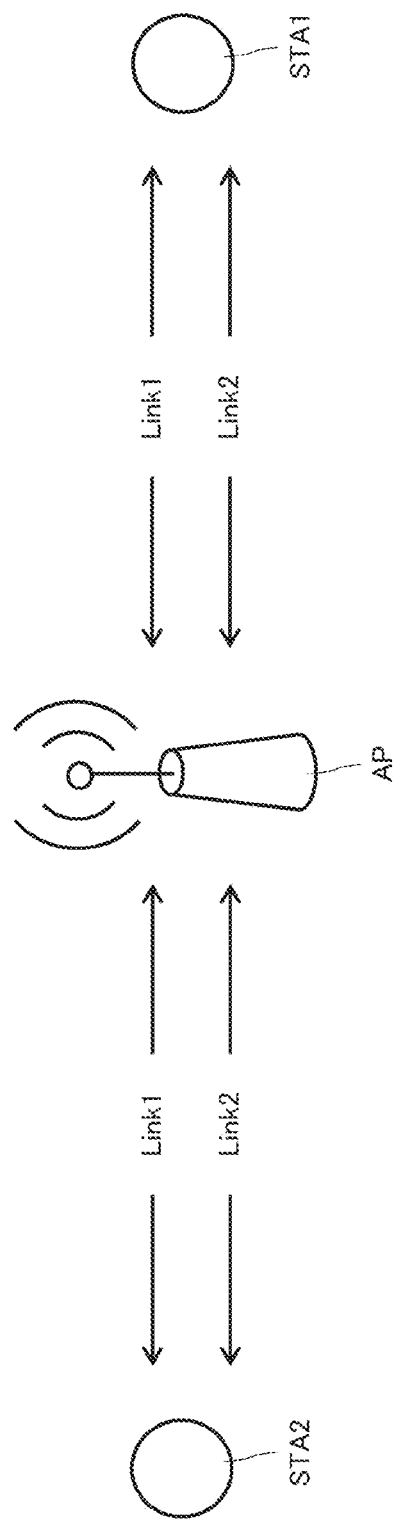
FIG. 1 is a diagram illustrating a configuration example of a communication system.

FIG. 1 schematically illustrates a configuration example of an MLO-compatible communication system to which the present disclosure is applied. The illustrated communication system includes one base station or access point (AP) and two slave devices STA (STAtion) 1 and STA2 connected to the AP. Only two STAs are illustrated in FIG. 1 for simplification of the drawing, but it is also assumed that three or more STAs are connected to one AP.

Two links, that is, Link1 and Link2, can be used for data communication between the AP and the STA1 and between the AP and the STA2. Each of the AP, the STA1, and the STA2 is an MLO-compatible communication device. Hereinafter, the MLO-compatible communication device is also referred to as "multi link device (MLD)".

Note that "link" referred to in this specification is a wireless transmission path through which data can be transmitted between two communication devices. The individual links are selected from, for example, a plurality of wireless transmission paths (channels) divided in accordance with a frequency domain and independent from each other. The two links used in the communication system illustrated in FIG. 1 use channels selected from a plurality of channels included in any of frequency bands such as a 2.4 GHz band, a 5 GHz band, a 6 GHz band, and a 920 MHz band. The two links used in the communications system illustrated in FIG. 1 may be two channels selected from the same frequency band or two channels selected from different frequency bands. In addition, the frequency band including a channel selected by at least one of the two links used in the communication system illustrated in FIG. 1 may be a frequency band (unlicensed band) permitted to be used by database access such as a spectrum access system (SAS).

B. DEVICE CONFIGURATION

Figure 2:
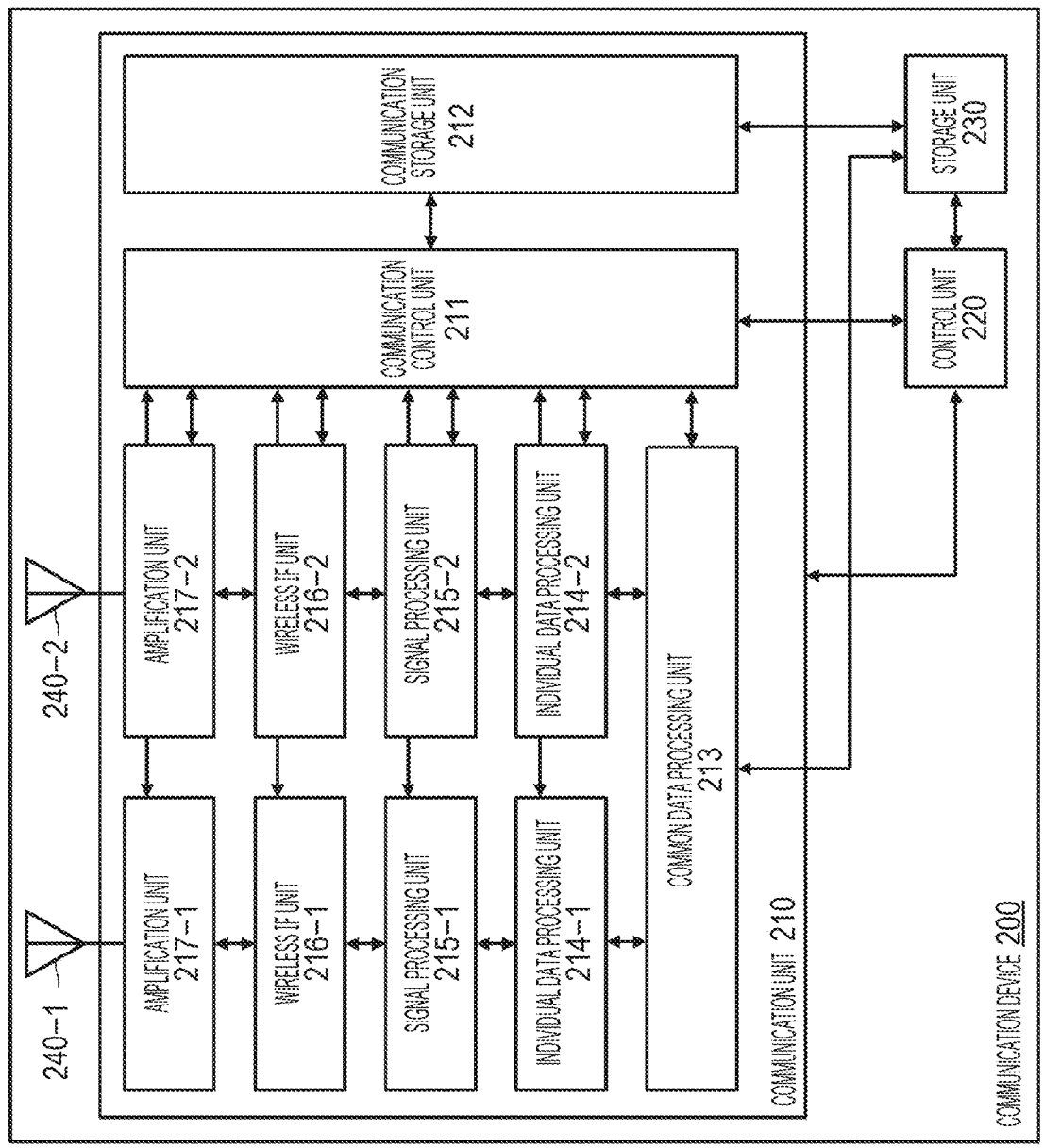
FIG. 2 is a diagram illustrating a configuration example of a communication device 200.

FIG. 2 illustrates an internal configuration example of a communication device 200. The communication device 200 is an MLO-compatible communication device, and is assumed to operate as an AP, a STA1, or a STA2 in the communication system illustrated in FIG. 1. The communication device 200 mainly includes a communication unit 210, a control unit 220, a storage unit 230, and an antenna 240. Furthermore, the communication unit 210 includes a communication control unit 211, a communication storage unit 212, a data processing unit including a common data processing unit 213 and an individual data processing unit 214, a signal processing unit 215, a wireless interface (IF) unit 216, and an amplification unit 217.

The individual data processing unit 214, the signal processing unit 215, the wireless interface (IF) unit 216, the amplification unit 217, and the antenna 240 are provided for each link. It is assumed that the communication device 200 performs the MLO using two links, that is, the Link1 and the Link2. For example, the individual data processing unit 214-1, the signal processing unit 215-1, the wireless interface unit 216-1, the amplification unit 217-1, and the antenna 240-1 are set as one individual communication set for transmission/reception processing in the Link1, and the individual data processing unit 214-2, the signal processing unit 215-2, the wireless interface unit 216-2, the amplification unit 217-2, and the antenna 240-2 are set as another individual communication set for transmission/reception processing in the Link2.

The communication control unit 211 controls an operation of each unit in the communication unit 210 and information transmission between the individual units. Furthermore, the communication control unit 211 performs control to transfer control information and management information notification of which is provided to another communication device to a data processing unit (common data processing unit 213, individual data processing unit 214-1, and individual data processing unit 214-2).

The communication storage unit 212 holds information used by the communication control unit 211. Furthermore, the communication storage unit 212 holds data to be transmitted by the communication device 200 and data received by the communication device 200.

The data processing unit includes the common data processing unit 213 and the individual data processing unit 214. In addition, the individual data processing unit 214 includes the individual data processing unit 214-1 and the individual data processing unit 214-2 for the individual links.

At the time of transmission, the common data processing unit 213 performs sequence management of the data held in the communication storage unit 212 and the control information and the management information received from the communication control unit 211, performs encryption processing or the like to generate a data unit, and performs allocation to the individual data processing units 214-1 and 214-2. At the time of reception, the common data processing unit 213 performs decryption processing and reorder processing on the data unit.

In the present disclosure, in a case where the Common Block Ack scheme is applied, the common data processing unit 213 performs data processing for transmitting Common Block Ack in which data acquisition success/failure information in each Block Ack Session, that is, for each piece of sender information is collected using a Partial-state or cache Common Scoreboard, and details thereof will be described later.

At the time of transmission, the individual data processing units 214-1 and 214-2 perform a channel access operation based on carrier sense in a corresponding link, add a MAC header and an error detection code to data to be transmitted, and perform processing of concatenating multiple data units. At the time of reception, the individual data processing units 214-1 and 214-2 perform decoupling processing, analysis and error detection on the MAC headers of the received data units, and a retransmission request operation.

Note that the operations of the common data processing unit 213 and the individual data processing units 214-1 and 214-2 are not limited to the above, and for example, one unit may perform the operation of the other unit.

At the time of transmission, the signal processing units 215-1 and 215-1-2 perform encoding, interleaving, modulation, and the like on the data unit, and add a physical header to generate a symbol stream. Furthermore, at the time of reception, the signal processing units 215-1 and 215-2 analyze the physical header, perform demodulation, deinterleaving, decoding, and the like on the symbol stream to generate a data unit. Moreover, the signal processing units 215-1 and 215-2 estimate complex channel characteristics and perform spatial separation processing as necessary.

At the time of transmission, the wireless interface units 216-1 and 216-2 perform digital-analog, signal conversion, filtering, up-conversion, and phase control on a symbol stream to generate a transmission signal. In addition, at the time of reception, the wireless interface units 216-1 and 216-2 perform down-conversion, filtering, and analog-digital signal conversion on a received signal to generate a symbol stream.

The amplification units 217-1 and 217-2 amplify signals input from the wireless interface units 216-1 and 216-2 or the antennas 240-1 and 240-2. A part of the amplification units 217-1 and 217-2 may be a component outside the communication unit 210. Furthermore, a part of the amplification units 217-1 and 217-2 may be included in the wireless interface units 216-1 and 216-2.

The control unit 220 controls the communication unit 210 and the communication control unit 211. Furthermore, the control unit 220 may perform some operation of the communication control unit 211 instead. Moreover, the communication control unit 211 and the control unit 220 may be configured as one block.

The storage unit 230 holds information used by the communication unit 210 and the control unit 220. Furthermore, the storage unit 230 may perform some operation of the communication storage unit 212 instead. Moreover, the storage unit 230 and the communication storage unit 212 may be configured as one block.

By setting the individual data processing unit 214-1, the signal processing unit 215-1, the wireless interface unit 216-1, the amplification unit 217-1, and the antenna 240-1 as one individual communication set, wireless communication is performed on the Link1. In addition, by setting the individual data processing unit 214-2, the signal processing unit 215-2, the wireless interface unit 216-2, the amplification unit 217-2, and the antenna 240-2 as another individual communication set, wireless communication is performed on the Link2. Although only two individual communication sets are depicted in FIG. 2, three or more sets may be components of the communication device 200, and each of the individual communication sets may be configured to perform wireless communication on each link. Furthermore, the storage unit 230 or the communication storage unit 212 may be included in each of the individual communication sets.

The link is a wireless transmission path through which data can be transmitted between two communication devices, and each link is selected from, for example, a plurality of wireless transmission paths (channels) divided in accordance with a frequency domain and independent from each other. The links used by the individual communication sets may be two channels selected from the same frequency band or two channels selected from different frequency bands. In addition, the individual data processing unit 214 and the signal processing unit 215 may be set as one set, and two or more sets may be connected to one common wireless interface unit 216.

The wireless interface unit 216, the amplification unit 217, and the antenna 240 may be set as one set, and two or more sets may be components of the communication device 200.

The communication unit 210 can also include one or more large scale integration (LSI).

The common data processing unit 213 is also referred to as "upper MAC" or "higher MAC", and the individual data processing unit 214 is also referred to as "lower MAC". Furthermore, a set of the individual data processing unit 214 and the signal processing unit 215 is also referred to as "AP entity" or "Non-AP entity". Alternatively, a set of the individual data processing unit 214 and the signal processing unit 215 is also referred to as "MAC entity" without distinguishing between AP and Non-AP. The communication control unit 211 is also referred to as "MLD management entity".

C. FUNCTIONAL CONFIGURATION EXAMPLE OF MLD

Figure 3:
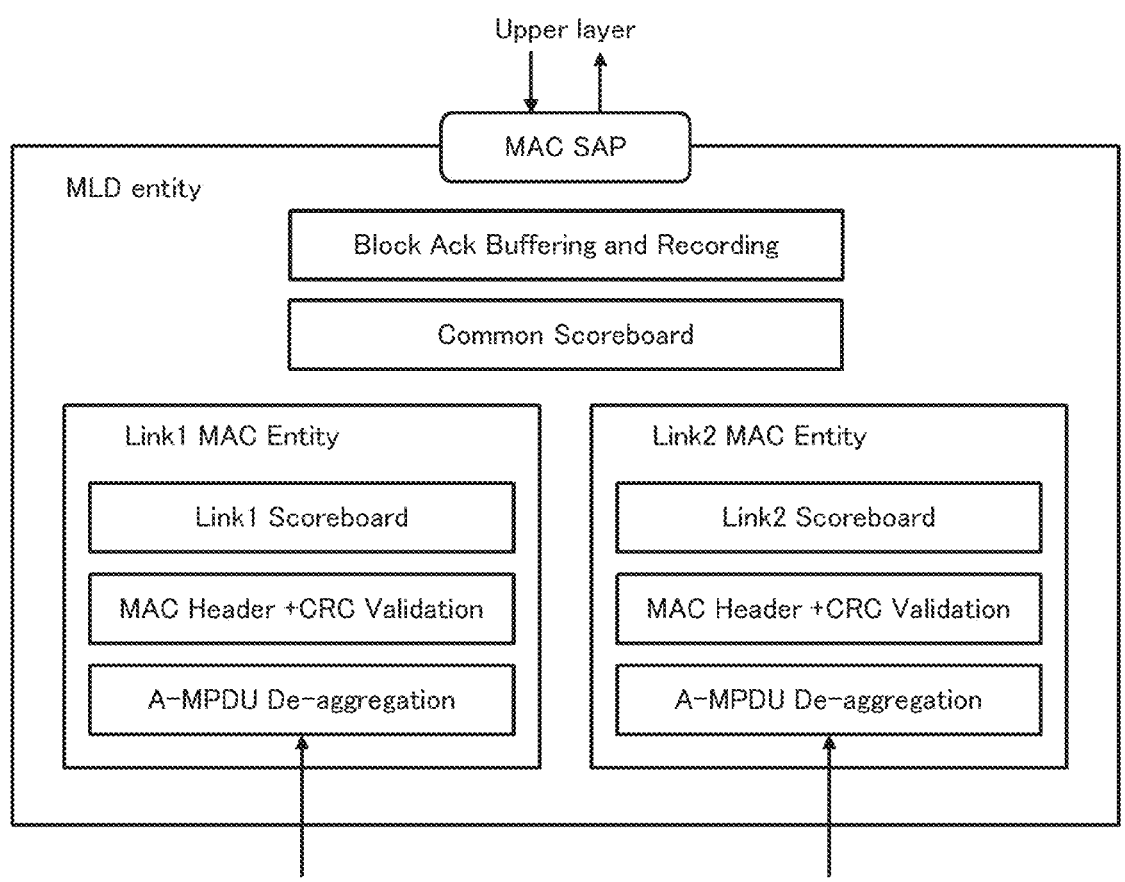
FIG. 3 is a diagram illustrating a functional configuration example of an MLD.

FIG. 3 illustrates a functional configuration example of an MLO-compatible communication device, that is, an MLD. Here, only functional blocks related to the present disclosure at the time of data reception are illustrated for simplification. In FIG. 3, the Link1 MAC entity and the Link2 MAC entity are functional blocks in the individual data processing units 214-1 and 214-2, respectively, and the MLD entity is a functional block in the common data processing unit 213.

A MAC address is assigned to each of the Link1 MAC entity, the Link2 MAC entity, and the MLD entity. As the transmission address or the reception address of the communication performed via the Link1 and the Link2, the MAC address assigned to the MAC entity of each link is used. In addition, it is assumed that the MAC address assigned to the MLD entity is used at the time of Authentication or Block Ack Session establishment.

The Link1 MAC Entity and the Link2 MAC Entity each include a MAC Protocol Data Unit (A-MPDU) De-aggregation block, a MAC Header+Cyclic Redundancy Code (CRC) validation block, and a Link Scoreboard block as functional blocks that perform MAC layer reception processing in a corresponding link.

The A-MPDU De-aggregation block performs processing of dividing a data signal transmitted with a plurality of packets (data units) aggregated into each packet.

The MAC Header+CRC Validation block reads the MAC header of each packet divided by the A-MPDU De-aggregation block and checks the CRC of the entire packet. In the block, the destination of the received packet and the type of the received packet (whether signal is data signal or control signal) are recognized from the information of the MAC header. In addition, in the block, whether or not the received packet has been correctly acquired is determined by checking the CRC. In a case where it is determined in the block that the received packet has been correctly acquired, the information acquired from the payload of the packet is transferred to an Upper layer. On the other hand, in a case where it is determined in the block that the received packet has not been correctly acquired, the received packet is discarded at this point of time, and the information is not transferred to the upper layer.

The Link Scoreboard block stores acquisition success/failure information of each packet determined in the MPDU Header+CRC Validation block in order to generate Block Ack on the corresponding link. The Link Scoreboard is a Partial-state scoreboard that temporarily stores acquisition success/failure information in at most one Block Ack Session. Details of the Link Scoreboard will be described later.

The MLD entity includes a Block Ack Buffering and Recording block and a Common Scoreboard block as functional blocks that perform processing common to all links. In the MLD, data processing for transmitting Common Block Ack in which data acquisition success/failure information in each Block Ack Session, that is, for each piece of sender information is collected is performed using the Common Scoreboard.

In order to generate the Common Block Ack, the Common Scoreboard block stores success/failure of acquisition of each packet determined by the MAC Header+CRC Validation block for each link. The Common Scoreboard is a Partial-state scoreboard that temporarily stores acquisition success/failure information in at most one Block Ack Session. Details of the Common Scoreboard will be described later.

The Block Ack Buffering and Recording block temporarily stores the packets acquired through the MAC layer reception processing performed by each Link MAC Entity, and performs reorder processing on the basis of a sequence number assigned to each packet. The packets acquired through each Link Mac Entity are transferred to the upper layer in ascending order of sequence number. In a case where there is a packet that cannot be acquired halfway, the Block Ack Buffering and Recording block temporarily stores the packets with sequence numbers after the sequence number of the packet without transferring the packets to the upper layer. In addition, when the packet that cannot be acquired is retransmitted and can be correctly acquired, or when the data sender side provides notification that retransmission of the packet is not performed by Block Ack Request or the like, the Buffering and Recording block transfers the temporarily stored packets to the upper layer.

It is assumed in the present embodiment that both the Link Scoreboard included in each Link MAC Entity and the Common Scoreboard included in the MLD Entity are managed as the Partial-state scoreboards. In the IEEE 802.11-2016, management of the Partial-state Scoreboard is described as follows, and the present embodiment is also basically based on the following description.

(1) The receiver must maintain a temporary block acknowledgement record.

(2) In the temporary record, bitmap information, WindowStart$_R$ (minimum sequence number value in bitmap), WindowEnd$_R$ (maximum sequence number value in bitmap), an address of an originator (data sender), a traffic identifier (TID), and WindowSize$_R$ (maximum transmission window size, value determined at Block Ack Session to be described later), these pieces of information being associated with a sequence number, are stored.

(3) During a Partial-state operation, the receiver maintains the current record as long as receiving at least data from the same originator.

(4) When data from another originator or another TID (that is, another sender information) is received, in a case where a resource is needed to store a temporary record for the new originator and the new TID (that is, new sender information), the existing temporary record may be discarded, such as by overwriting.

D. COMMON BLOCK ACK

Figure 4:
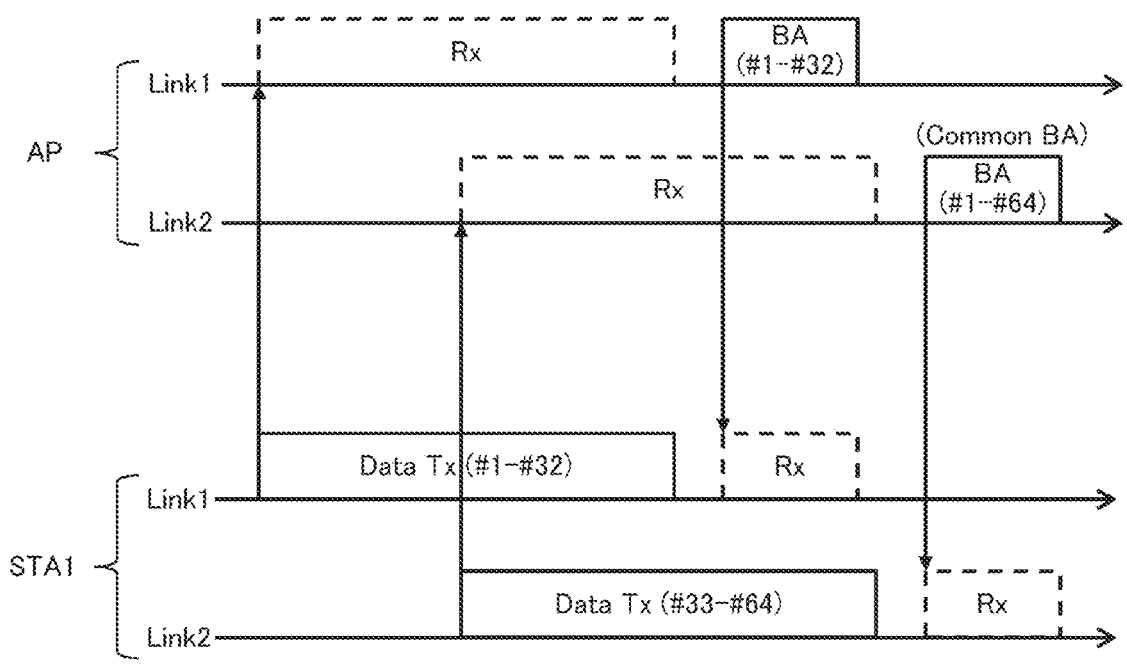
FIG. 4 is a diagram illustrating an operation example of a multi-link operation.

FIG. 4 illustrates an example of a communication sequence in which the STA1 performs data transmission using the Link1 and the Link2 and the AP transmits Common Block Ack in the communication system illustrated in FIG. 1 as an example of the multi-link operation.

Note that the horizontal axis in FIG. 4 is a time axis, and indicates a communication operation at each time on each link of the AP and the STA1. The square block drawn by a solid line represents a transmission frame at a corresponding communication device, link, and time, the arrow in a vertical solid line indicates frame transmission to a destination, and the square block drawn by a dotted line represents a reception frame. In addition, in order to simplify the description, all the TIDs of the packets transmitted from the STA1 in FIG. 4 are assumed to be the same.

When the STA1 acquires a transmission right on the Link1, the STA1 transmits a data signal (A-MPDU) obtained by aggregating packets with sequence numbers #1 to #32. Upon receiving this data signal, the AP transmits Block Ack (BA) including acquisition success/failure information of the packets with the sequence numbers #1 to #32 to the STA1 on the Link1. Note that since the packet acquisition success/failure information is indicated by information in a bitmap format, the packet acquisition success/failure information is also referred to as "bitmap information" below.

Furthermore, when the STA1 acquires the transmission right on the Link2, the STA1 transmits a data signal obtained by aggregating packets with sequence numbers #33 to #64. After the STA1 finishes transmitting the data signal on the Link2, the AP generates Block Ack. At this time, since the AP holds not only the bitmap information of the packets with the sequence numbers #33 to #64 received on the Link2 but also the bitmap information of the packets with the sequence numbers #1 to #32 received on the Link1, the AP generates Common Block Ack including the bitmap information with the sequence numbers #1 to #64 and transmits the Common Block Ack to the STA1 on the Link2.

By the AP transmitting the Common Block Ack in this manner, if the STA1 cannot correctly receive the Block Ack previously transmitted by the AP on the Link1, but can receive the Common Block Ack transmitted by the AP on the Link2, the STA1 can acquire the bitmap information of all the packets transmitted on each link and perform retransmission control in such a manner that unnecessary data is not retransmitted.

Note that, in the example of the communication sequence illustrated in FIG. 4, it is assumed that the Block Ack transmitted by the AP on the Link1 provides notification of only the bitmap information of the packets (#1 to #32) received on the Link1. However, in a case where a part of the bitmap information of the packets (#33 to #64) received on the Link2 can be acquired at the time of generating the Block Ack, the AP may generate and transmit the Common Block Ack on the Link1.

Figure 5:
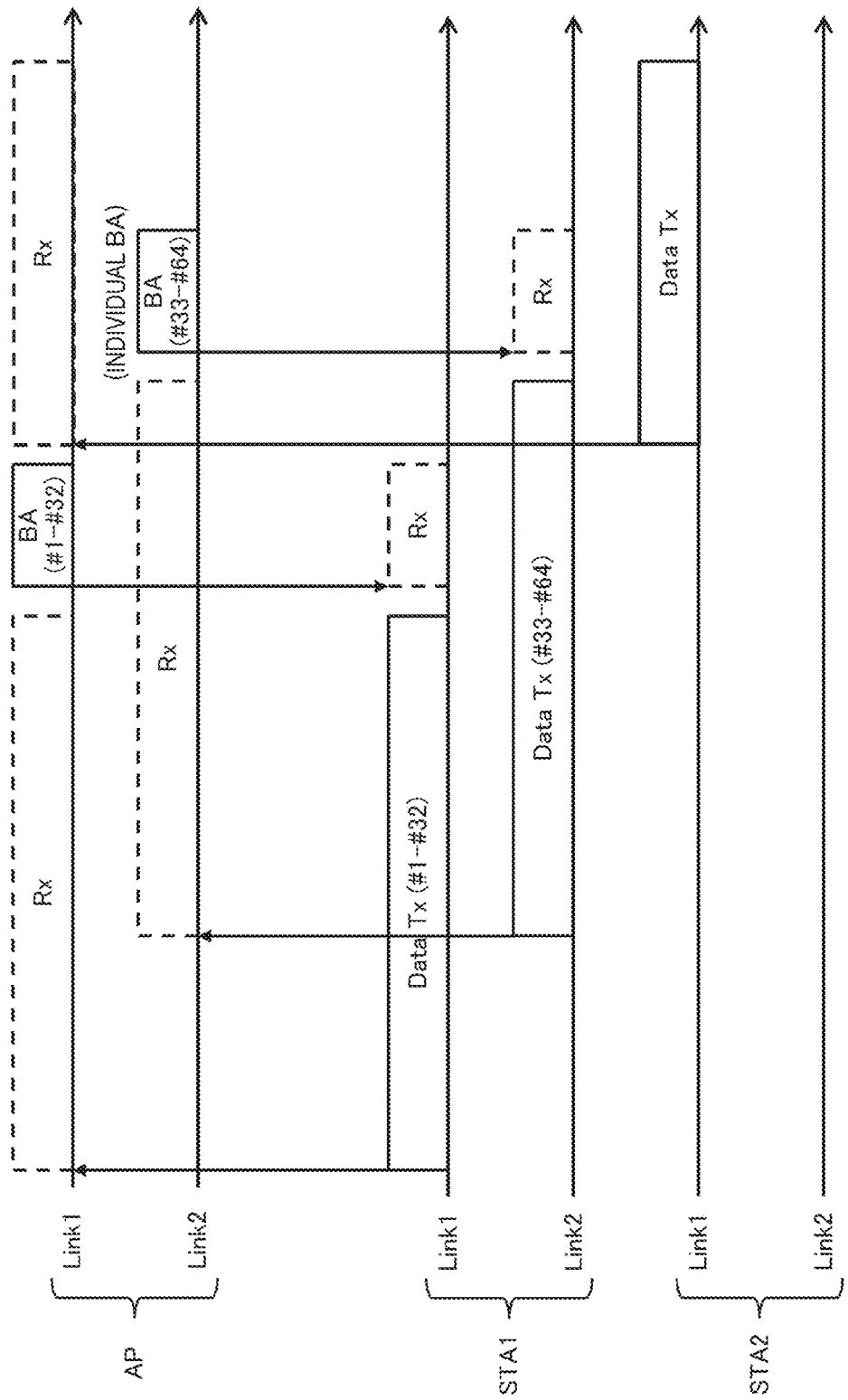
FIG. 5 is a diagram illustrating another operation example of the multi-link operation.

FIG. 5 illustrates another example of the communication sequence of the multi-link operation performed in the communication system illustrated in FIG. 1. In the example of the communication sequence illustrated in FIG. 5, the STA1 performs data transmission using the Link1 and the Link2, and the STA2 performs data transmission to the AP using the Link1.

Note that the horizontal axis in FIG. 5 is a time axis, and indicates a communication operation at each time on each link of the AP, the STA1, and the STA2. The square block drawn by a solid line represents a transmission frame at a corresponding communication device, link, and time, the arrow in a vertical solid line indicates frame transmission to a destination, and the square block drawn by a dotted line represents a reception frame. In addition, in order to simplify the description, all the TIDs of the packets transmitted from the STA1 and the STA2 in FIG. 5 are assumed to be the same.

When the STA1 acquires a transmission right on the Link1, the STA1 transmits a data signal obtained by aggregating packets with sequence numbers #1 to #32. Upon receiving this data signal, the AP transmits Block Ack including bitmap information of the packets with the sequence numbers #1 to #32 to the STA1 on the Link1. In addition, the AP holds the bitmap information of the packets with the sequence numbers #1 to #32 in Common Scoreboard in preparation for generation of Common Block Ack.

Furthermore, when the STA1 acquires the transmission right on the Link2, the STA1 transmits a data signal obtained by aggregating packets with sequence numbers #33 to #64. Here, before the STA1 finishes transmitting data on the Link2, the STA2 acquires the transmission right on the Link1 and transmits the data signal. When the AP receives the data signal from the STA2, bitmap information corresponding to the data received from the STA2 is held in the Common Scoreboard in the AP and the Link Scoreboard of the Link1. In this case, since the bitmap information corresponding to the received packet from the STA1 held in the Common Scoreboard is different in the originator (or sender information), there is a high possibility that the bitmap information is deleted by overwriting or the like. At the time when the STA1 finishes transmitting the data signal on the Link2, the AP does not hold the bitmap information corresponding to the packet received from the STA1 on the Link1 in any scoreboard, and thus cannot transmit the Common Block Ack to the STA1.

In a case where the Common Scoreboard is managed as a Partial-state scoreboard in this manner, in the situation described above, the opportunity particularly for an AP that receives data signals from a plurality of terminals on a plurality of links to transmit the Common Block Ack is limited. Furthermore, in a case where data signals associated with a plurality of TIDs are received on a STA side, a similar problem occurs.

Therefore, the present disclosure provides an appropriate update condition and method for Common Scoreboard under a situation in which the Common Scoreboard is managed as a Partial-state scoreboard in an MLO-compatible communication system. According to the present disclosure, the communication device (for example, AP in FIG. 1) that receives data signals from a plurality of terminals on a plurality of links can increase the opportunity to transmit Common Block Ack and improve reliability of ARQ.

E. FIRST EXAMPLE

In this section, a first example of a communication system to which the present disclosure is applied will be described.

E-1. Overall Sequence

Figure 6:
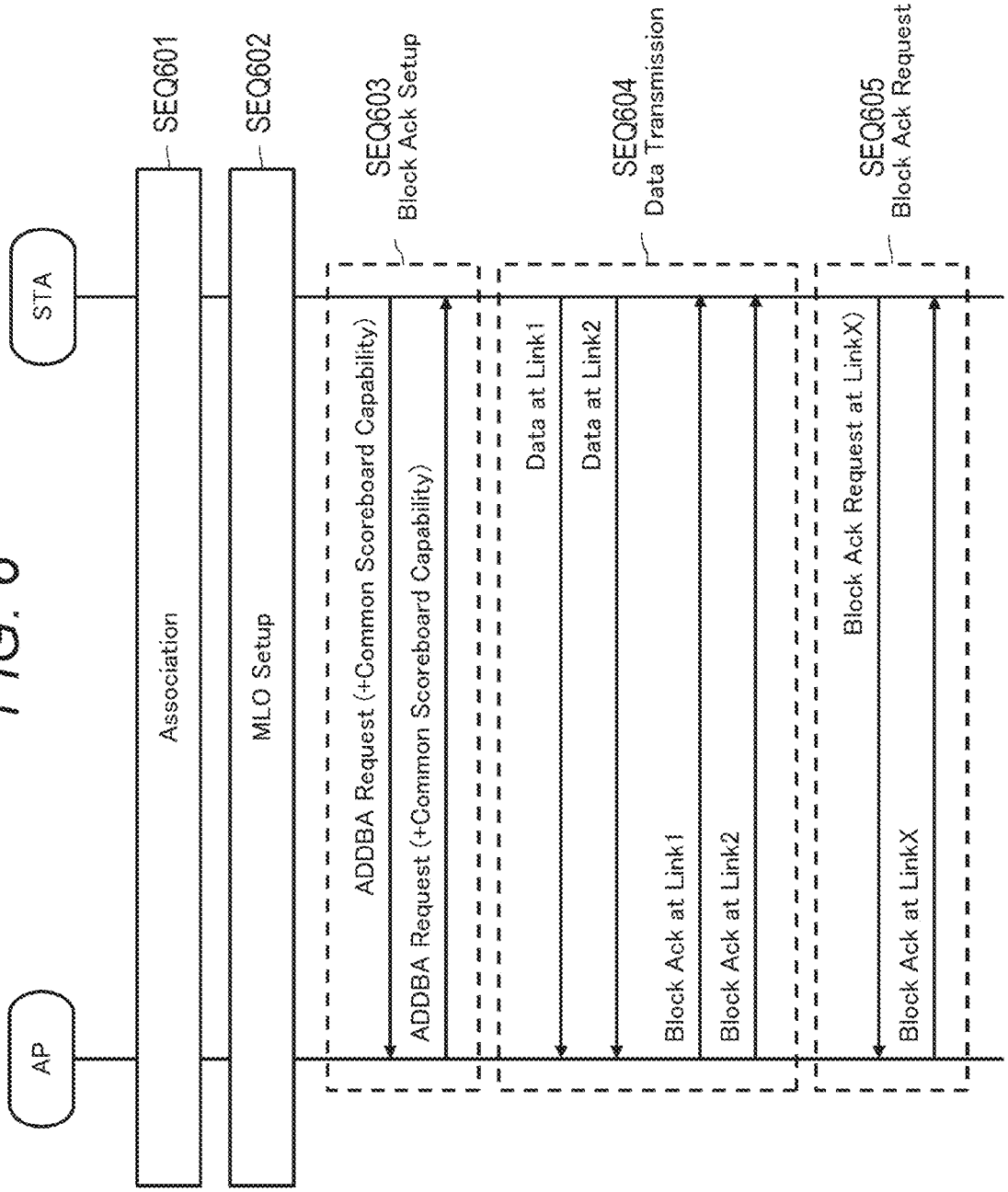
FIG. 6 is a diagram illustrating an example of a communication sequence in an MLO-compatible communication system.

FIG. 6 illustrates an example of a communication sequence implemented in the communication system to which the present disclosure is applied. In FIG. 6, the communication system is assumed to be an MLO-compatible communication system in which one AP and one STA are connected by using the Link1 and the Link2.

First, in an association phase (SEQ 601), the association (Association) procedure is performed between the AP and the STA, and the STA participates in a Basic Service Set (BSS) of the AP. In the IEEE 802.11 standard, the association procedure is performed by the STA transmitting an association request to the AP, and the AP transmitting an association response to the STA to provide notification of an association identifier (AID).

Next, in an MLO setup phase (SEQ 602), setup of the Link1 and the Link2 for communication between the AP and the STA is performed. In the present disclosure, in this phase, notification of the MAC addresses of Link1 MAC Entity, Link2 MAC Entity, and MLD Entity is provided between the AP and the STA, and these are managed as one sender (originator). Note that the MLO setup phase may be included in the association phase.

Next, in a Block Ack setup phase (SEQ 603), an ADDBA (ADD Block Acknowledgement) Request frame and a Response frame are exchanged between the AP and the STA, and Block Ack Session is established. The information exchanged between the AP and the STA includes Block Ack Policy, TID, Buffer Size, and the like, and the Window Size$_R$ described above is determined by the exchanged Buffer Size.

The present embodiment is characterized in that Common Scoreboard Capability is included in the ADDBA Request frame and the ADDBA Response frame. Since the STA exchanges the Common Scoreboard Capability indicating whether or not to manage the Common Scoreboard with the AP in the Block Ack setup phase, the STA can determine whether or not the AP can generate the Commom Block Ack and correctly set Ack Policy in the header of a data packet, for example. Details of the Common Scoreboard Capability will be described later.

Next, in a data transmission phase (SEQ 604), the STA transmits data using the Link1 and the Link2, and the AP transmits Block Ack on the Link1 and the Link2. The STA, which is a data sender, includes Ack Policy indicating which one of Common Block Ack and Normal Ack is requested in the header of the packet and transmits the packet. This point will be described later in detail. In addition, the method of updating the Common Scoreboard and generation of the Common Block Ack in this phase will be described later.

Next, in a Block Ack Request phase (SEQ 605), the STA transmits a Block Ack Request (BAR) frame to the AP on an arbitrary link (link X). In response thereto, the AP transmits the Block Ack frame on the same link (link X). The BAR frame is used not only when the STA wants to acquire the Block Ack but also when the Scoreboard and the Window Start$_R$ are initialized between the AP and the STA. The method of updating the Common Scoreboard in the Block Ack Request phase will be described later.

E-2. Block Ack Setup Phase

As described with reference to FIG. 6, in the Block Ack setup phase, the ADDBA (ADD Block Acknowledgement) Request frame and the Response frame are exchanged between the AP and the STA, and the Block Ack Session is established.

Figure 7:
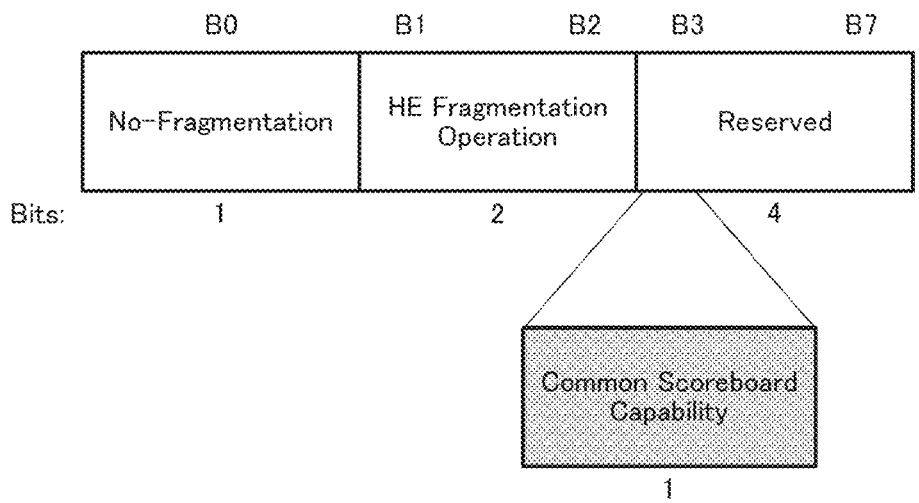
FIG. 7 is a diagram illustrating a configuration example of an ADDBA Capabilities field.

FIG. 7 illustrates a configuration example of an ADDBA Capabilities field notification of which is provided by the ADDBA Request frame and the ADDBA Response frame. In the example illustrated in FIG. 7, notification of the Common Scoreboard Capability is provided by using a part (one bit in illustrated example) of a 5-bit reserved area (Reserved bit) in the ADDBA Capabilities field.

The data sender (originator) can determine whether or not the reception side can manage bitmap information by the Common Scoreboard and whether or not the Common Block Ack can be generated on the basis of the information of the Common Scoreboard Capability field. Therefore, the data sender (originator) can correctly set the Ack Policy, for example, is the header of the data packet.

Note that the information of the Common Scoreboard Capability is not necessarily included in the ADDBA Capabilities field, and may be provided in notification in either the ADDBA Request frame or the ADDBA Response frame.

E-3. Data Transmission Phase

As described with reference to FIG. 6, in the Data Transmission phase, the STA transmits data using the Link1 and the Link2, and the AP transmits the Block Ack on the Link1 and the Link2.

Figure 8:
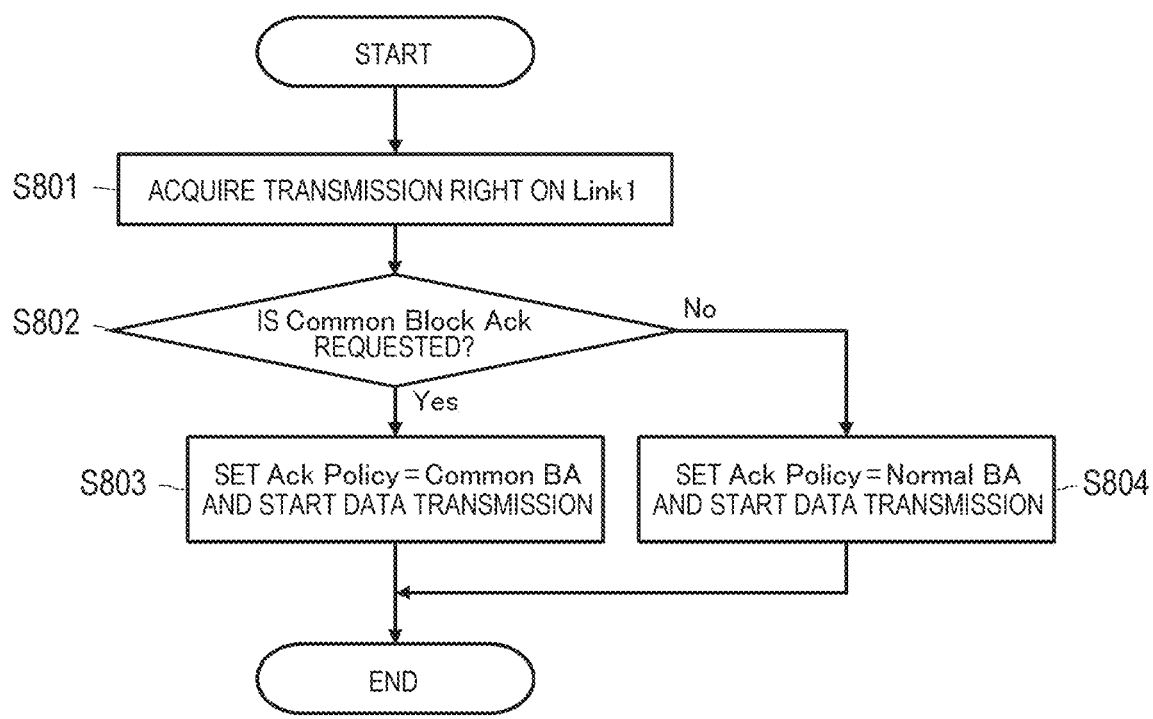
FIG. 8 is a flowchart illustrating a processing procedure for an STA to perform data transmission in a Data Transmission phase.

FIG. 8 illustrates, as a flowchart, a processing procedure for the STA to perform data transmission in the Data Transmission phase.

When the STA acquires a transmission right (Transmission Opportunity: TXOP) by ending backoff in a certain link (for example, Link1) or the like (step S801), the STA determines whether or not to request Common Block Ack from the AP that is a reception side (step S802).

In a case where the Common Block Ack is requested from the AP (Yes in step S802), the STA sets Ack Policy in a MAC Header/QoS Control field attached to the head of a packet to "Common BA" (that is, acknowledgement response including data acquisition success/failure information in a plurality of links) and starts to transmit a data signal (step S803). Since the STA exchanges the Capability information (Common Scoreboard Capability) indicating whether or not to manage the Common Scoreboard with the AP in the Block Ack setup phase (see FIGS. 6 and 7), the STA can determine whether or not the AP can generate the Commom Block Ack and correctly set the Ack Policy in the header of the data packet, for example.

On the other hand, in a case where the Common Block Ack is not requested from the AP (No in step S802), the STA sets the Ack Policy in the MAC Header/QoS Control field attached to the head of the packet to a response other than "Common BA" (for example, "Normal Ack") and starts to transmit the data signal (step S804).

Note that how the STA determines whether or not to request the Common Block Ack in step S802 is not particularly limited. For example, the STA may request the Common Block Ack only when transmitting data required to have low delay or high reliability, or may be set to always transmit the Common Block Ack.

Figure 9:
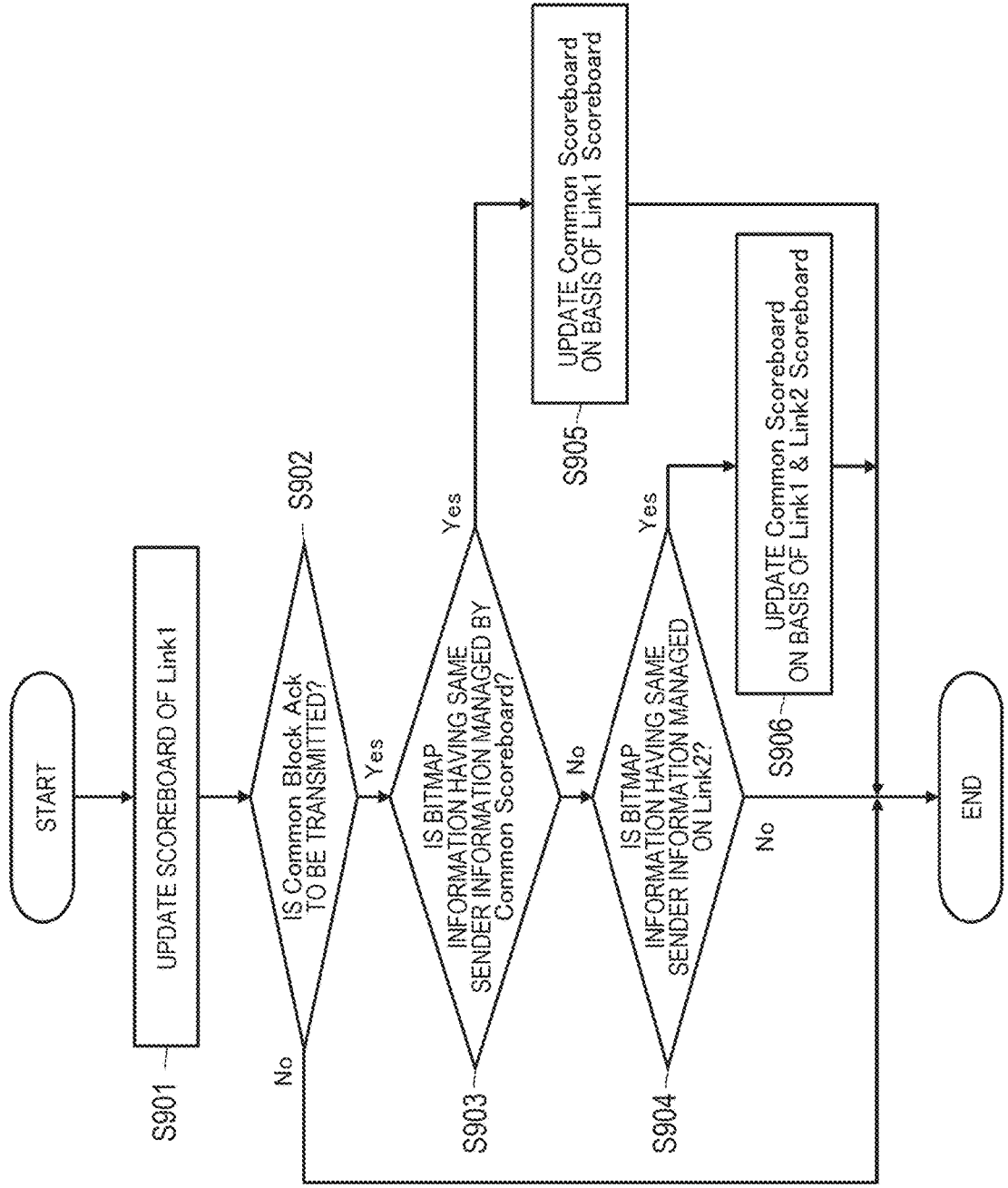
FIG. 9 is a flowchart illustrating a processing procedure (first example) performed by an AP in the Data Transmission phase.

FIG. 9 illustrates, as a flowchart, a processing procedure when the AP receives data in the Data Transmission phase.

The AP receives a data signal on a certain link (for example, Link1), and updates the Link Scoreboard of the Link MAC entity corresponding to the link on the basis of data acquisition success/failure information by the conventional method (step S901).

Next, the AP checks whether to transmit the Common Block Ack (step S902). Specifically, the AP checks whether the Block Ack Setup including the Common Block Ack has been completed with the STA that is a data sender (originator), and the Ack Policy in the MAC Header/QoS Control field of a received packet is "Common BA". Since the STA exchanges the Capability information (Common Scoreboard Capability) indicating whether or not to manage the Common Scoreboard with the AP in the Block Ack setup phase (see FIGS. 6 and 7), the STA can determine whether or not the AP can generate the Commom Block Ack and correctly set the Ack Policy in the header of the data packet, for example.

In a case where the Block Ack setup has not been completed with the data sender or the Ack Policy in the MAC Header/QoS Control field of the received packet is not "Common BA" (No in step S902), the AP ends this processing without updating the Common Scoreboard.

On the other hand, in a case where the Block Ack setup has been completed with the data sender and the Ack Policy in the MAC Header/QoS Control field of the received packet is "Common BA" (Yes in step S902), the AP determines whether or not to update the Common Scoreboard.

As the determination as to whether or not to update the Common Scoreboard, the AP first checks whether or not the Link Scoreboard of the link on which data has been received and the Common Scoreboard manage the bitmap having the same sender information, that is, the same sender and the same TID (step S903).

In a case where the Link Scoreboard of the link (for example, Link1) on which data has been received and the Common Scoreboard manage the bitmap having the same sender and the same TID (Yes in step S903), the AP updates the bitmap information of the Common Scoreboard on the basis of the bitmap information (or information of SN in which bitmap is updated) of the Link1 Scoreboard of the Link1 on which data has been received (step S905), and ends this processing. As a result, as long as data is continuously received from the same sender as the one managed by the Common Scoreboard with the same TID, the acquisition success/failure information in the same Block Ack Session is sequentially updated in the Common Scoreboard on the basis of the acquisition success/failure information of the scoreboard of the link on which the data has been received.

Alternatively, in a case where the Link Scoreboard of the link (for example, Link1) on which data has been received and the Common Scoreboard do not manage the bitmap having the same sender and the same TID (No in step S903), the AP further checks whether the Link Scoreboard of a link (for example, Link2) different from the link on which data has been received and the Common Scoreboard manage the bitmap having the same sender and the same TID as the Link Scoreboard of the link (for example, Link1) on which data has been received (step S904).

Then, in a case where the Link Scoreboard of another link manages the bitmap having the same sender information, that is, the same sender and the same TID as the Link Scoreboard of the link on which data has been received (Yes in step S904), the AP creates and stores bitmap information having new sender information, that is, a new sender and a new TID in the Common Scoreboard on the basis of the bitmap information of the Link Scoreboard of each of the link on which data has been received and another link (step S906), and ends this processing. As a result, when data in which at least one of the sender or the TID is different from that managed by the Common Scoreboard is received (that is, when sender information is switched), in the Common Scoreboard, the acquisition success/failure information in new Block Ack Session is updated on the basis of the acquisition success/failure information managed by a scoreboard for each link.

Alternatively, in a case where the Link Scoreboard of another link does not manage the bitmap having the same sender information, that is, the same sender and the same TID as the Link Scoreboard of the link on which data has been received (No in step S904), the AP ends this processing without updating the Common Scoreboard.

Note that it is assumed in the present embodiment that the Link Scoreboard and the Common Scoreboard are updated when the CRC check is performed on the packets aggregated in all the links used, but the timing of updating each scoreboard is not limited thereto. For example, the Link Scoreboard may be updated when the CRC check of all the packets aggregated in each link is completed. In addition, the Common Scoreboard may be updated at intervals determined internally, or may be updated when reception of all data signals is completed.

Furthermore, it is assumed in the present embodiment that the AP acquires each MAC address of the subordinate STA, and stores and manages the MAC address of each of the Link MAC entity and the MLD entity for each sender (originator) in the MLO setup phase. Therefore, the AP can determine whether or not the sender of each link is the same STA by looking at the address of the sender when data is received on each link.

Figure 10:
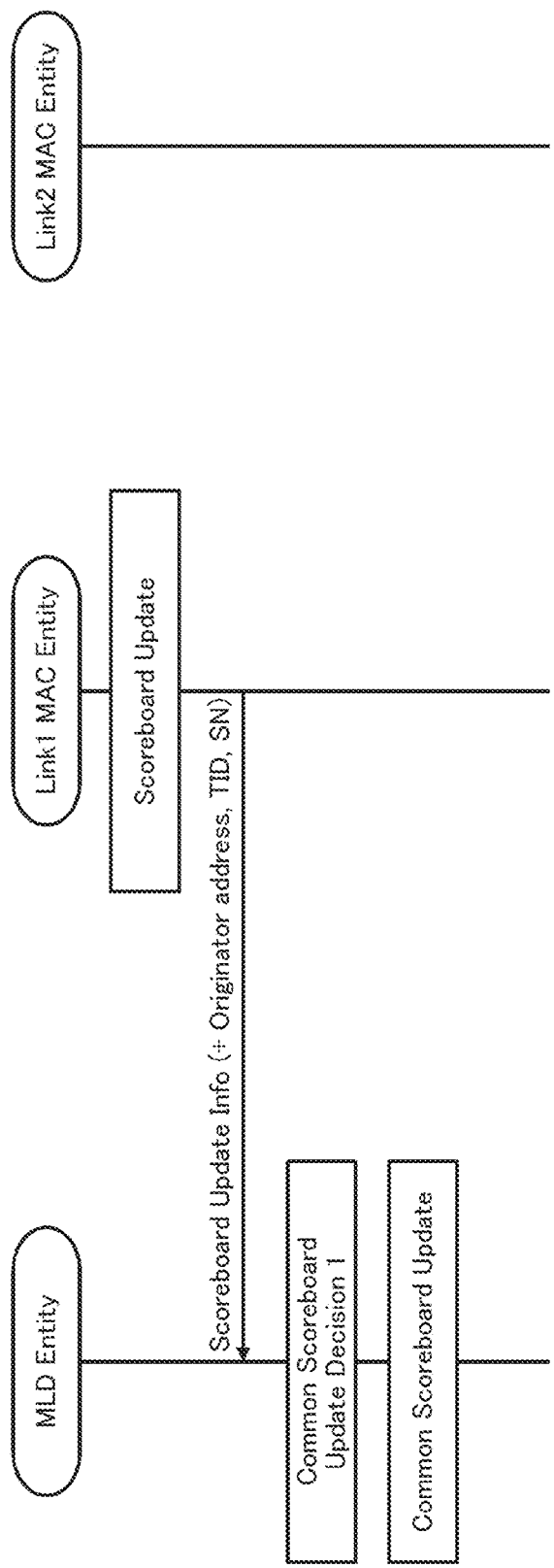
FIG. 10 is a diagram illustrating an example of an internal sequence when the AP receives a data signal.

FIG. 10 illustrates an example of an internal sequence when the AP receives a data signal in the Data Transmission phase. FIG. 10 illustrates an example of an internal sequence corresponding to step S905 in the flowchart illustrated in FIG. 9 when the AP updates the bitmap information of the Common Scoreboard on the basis of the bitmap information of the Link1 MAC Scoreboard. As described above, the AP is an MLO-compatible communication device, that is, an MLD, and includes the Link1 MAC Entity and the Link2 MAC Entity that perform individual data processing for each link and the MLD Entity that performs data processing common to all links as illustrated in FIG. 3. In addition, as scoreboards for storing data acquisition success/failure information in the AP, the Link1 Scoreboard and the Link2 Scoreboard included in the Link1 MAC Entity and the Link2 MAC Entity, respectively, and the Common Scoreboard included in the MLD Entity are provided.

When the Link1 MAC Entity updates the Link1 Scoreboard in response to the data being received on the Link1 (Scoreboard Update), the Link1 MAC Entity notifies the MLD Entity of Scoreboard Update Info including Originator Address, TID, and Updated SN.

The MLD Entity determines whether the bitmap information having the same sender information (that is, the same Originator Address and the same TID) is managed by the Common Scoreboard on the basis of the information acquired from the MAC Entity (Common Scoreboard Update Decision 1). This determination process corresponds to step S903 in the flowchart illustrated in FIG. 9. Here, it is assumed that Block Ack setup is completed with the STA that is a data sender (originator), and Ack Policy in the MAC Header/QoS Control field of the received packet specifies "Common BA".

Then, in a case where it is determined that the bitmap information having the Originator Address and the TID same as those of the Link Scoreboard is managed by the Common Scoreboard, the MLD Entity updates the Common Scoreboard (Common Scoreboard Update).

It is assumed that the MLD entity updates the Common Scoreboard in accordance with the following procedure. Note that, here, WindowStart$_R$, WindowEnd$_R$, and WindowSize$_R$ of the Common Scoreboard are respectively described as WindowStart$_{Rc}$, WindowEnd$_{Rc}$, and WindowSize$_{Rc}$. In addition, in a case where the SN space is extended, a numerical value larger than $2^{11}$ may be used.

(1) When WindowStart$_{Rc}$≤SN≤WindowEnd$_{Rc}$, "1" is set in a portion corresponding to SN in the bitmap information of the Common Scoreboard.

(2) When WindowEnd$_{Rc}$<SN≤WindowStart$_{Rc}$+$2^{11}$, the following processing is performed.

(2-1) 0 is set from WindowEnd$_{Rc}$ to SN−1.
(2-2) WindowStart$_{Rc}$=SN−WindowSize$_{Rc}$+1 is set.
(2-3) WindowEnd$_{Rc}$=SN is set.
(2-4) "1" is set in the portion corresponding to the SN in the bitmap information of the Common Scoreboard.

In the present embodiment, the Common Scoreboard is a Partial State scoreboard and has only a capacity for storing bitmap information in one Block Ack Session, and is overwritten by returning to the head after one cycle. The condition of WindowStart$_{Rc}$≤SN≤WindowEnd$_{Rc}$ in (1) indicates that the corresponding SN falls within the window size of the Common Scoreboard, and in this case, the acquisition success/failure information of the packet with the SN is set at the corresponding bit position in the bitmap of the Common Scoreboard. In addition, the condition of WindowEnd$_{Rc}$<SN≤WindowStart$_{Rc}$+$2^{11}$ in (2) indicates that the end of the window size of the Common Scoreboard has been reached, and in this case, the processing returns to the head of the bitmap and sets the acquisition success/failure information of the packet with this SN.

Figure 11:
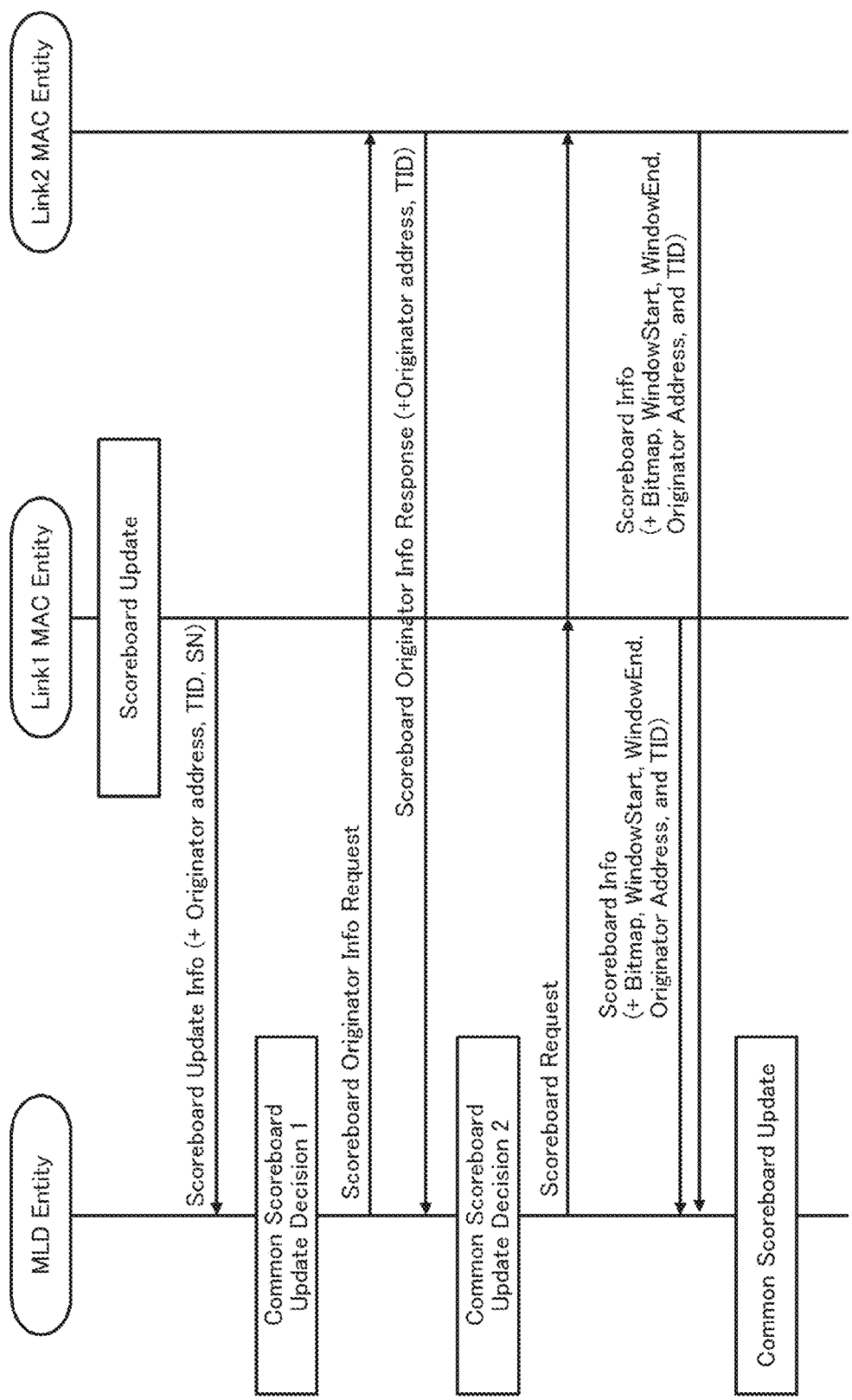
FIG. 11 is a diagram illustrating another example of the internal sequence when the AP receives the data signal.

FIG. 11 illustrates another example of the internal sequence when the AP receives a data signal in the Data Transmission phase. FIG. 11 illustrates an example of an internal sequence corresponding to step S906 in the flowchart illustrated in FIG. 9 when the AP updates the bitmap information of the Common Scoreboard on the basis of the bitmap information of the Link1 MAC Scoreboard and the bitmap information of the Link2 Scoreboard.

When the Link MAC Entity updates the Link1 Scoreboard in response to the data being received on the Link1 (Scoreboard Update), the Link1 MAC Entity notifies the MLD Entity of Scoreboard Update Info including Originator Address, TID, and Updated SN.

The MLD Entity determines whether or not the bitmap information having the same Originator Address and the same TID is managed by the Common Scoreboard on the basis of the information acquired from the Link1 MAC Entity (Common Scoreboard Update Decision 1). This determination process corresponds to step S903 in the flowchart illustrated in FIG. 9. Here, it is assumed that Block Ack setup is completed with the STA that is a data sender (originator), and Ack Policy in the MAC Header/QoS Control field of the received packet specifies "Common BA".

Then, when checking that the Common Scoreboard and the Link1 Scoreboard do not manage the bitmap information having the same Originator Address and the same TID, the MLD Entity transmits Scoreboard Originator Info Request to the Link2 MAC Entity. The Link2 MAC Entity transmits Scoreboard Originator Info Response including Originator Address and TID in response to the request from the MLD Entity. Note that in a case where the MLD entity periodically acquires the information of the Originator Address and the TID from the Link2 Scoreboard, the MLD entity does not need to transmit the Scoreboard Originator info Request to the Link2 MAC entity.

On the basis of the information acquired from the Link2 MAC Entity, the MLD entity determines whether or not to update the Common Scoreboard on the basis of whether or not the Common Scoreboard manages the bitmap information having the same sender information, that is, the same Originator Address and the same TID as the Link1 Scoreboard and the Link2 Scoreboard (Common Scoreboard Update Decision 2). This determination process corresponds to step S904 in the flowchart illustrated in FIG. 9.

In a case where the Link1 Scoreboard and the Link2 Scoreboard manage the bitmap information having the same sender information, that is, the same Originator Address and the same TID, the MLD Entity determines to create bitmap information having a new sender, that is, a new Originator Address and a new TID on the basis of the bitmap information of both scoreboards and update the Common Scoreboard. Therefore, the MLD entity transmits Scoreboard Request to the Link1 MAC entity and the Link2 MAC entity.

The Link1 MAC Entity and the Link2 MAC Entity transmit Scoreboard Info including bitmap information, WindowStart, WindowEnd, Originator Address, and TID in response to the Scoreboard Request from the MLD Entity.

Then, the MLD entity updates the Common Scoreboard in accordance with the following procedure on the basis of the Scoreboard Info collected from the Link1 MAC Entity and the Link2 MAC Entity (Common Scoreboard Update). Note that, here, WindowStart$_R$, WindowEnd$_R$, and WindowSize$_R$ of LinkX (Xth link) Scoreboard are respectively described as WindowStart$_{Rx}$, WindowEnd$_{Rx}$, and WindowSize$_{Rx}$.

(1) WindowEnd$_{Rc}$=max (WindowEND$_{R1}$, WindoWEND$_{R2}$) is set. That is, the Common Scoreboard is updated in accordance with one of the Link1 Scoreboard and the Link2 Scoreboard with a larger end value of the sequence number to be stored.

(2) WindowStart$_{Rc}$=WindowEnd$_{Rc}$−WindowSize$_{Rc}$+1 is set.

(3) A bitmap of the size of WindowSize$_{Rc}$ is created in such a manner that the start is WindowStart$_{Rc}$ and the end is WindowEnd$_{Rc}$ (0 is input at first).

(4) In each SN from WindowStart$_R$ to WindowEnd$_{Rc}$, in a case where either the bitmap information of the Link1 or the bitmap information of the Link2 is "1", "1" is set in the portion indicated by the corresponding SN in the bitmap information of the Common Scoreboard. That is, for the SN indicating that the packet is successfully acquired in at least one of the Link1 Scoreboard or the Link2 Scoreboard, "1" indicating that the packet is successfully acquired is set also in the bitmap information of the Common Scoreboard.

Furthermore, in a case where the sum of the window sizes of Link Scoreboards of the individual links is larger than the window size of the Common Scoreboard, some bitmap information may be damaged by the procedure described above when the Common Scoreboard is updated. In this case, the MLD entity may instruct not to transmit the Common Block Ack to the link in which the bitmap information cannot be stored in the Common Scoreboard, and may instruct to transmit normal Block Ack on the basis of the information of the Link Scoreboard for each link.

In addition, after updating the bitmap information, the Common Scoreboard may update the Link Scoreboard of each link in accordance with the bitmap information of the Common Scoreboard. Specifically, in the SN in which "1" is set in the Common Scoreboard and "0" is set in the Link Scoreboard, control may be performed in such a manner that "1" is set in the corresponding portion of the Link Scoreboard, while WindowStart and WindowEnd of each link are maintained.

Figure 12:
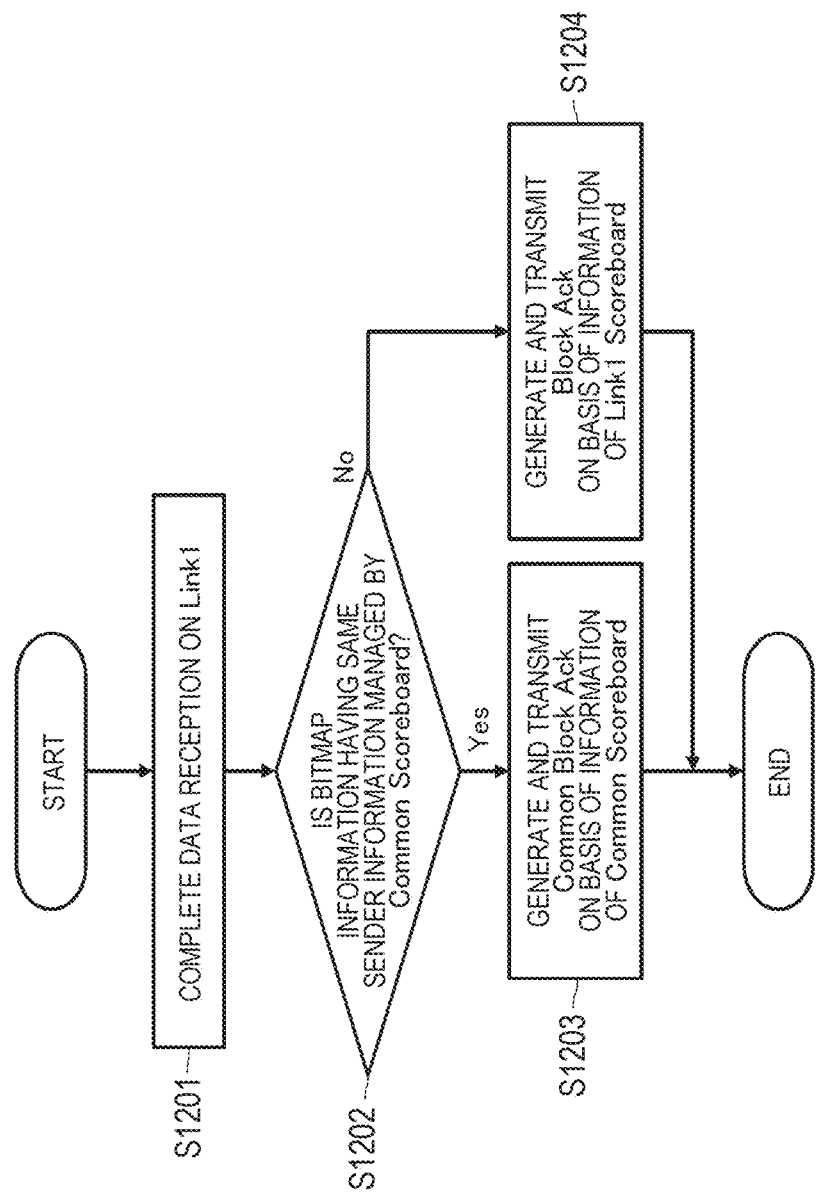
FIG. 12 is a flowchart illustrating a processing procedure (first example) for the AP to transmit Block Ack.

FIG. 12 illustrates, as a flowchart, a processing procedure for the AP to transmit Block Ack.

After completing the reception of a data signal on a certain link (for example, Link1) (step S1201), the AP checks whether or not the Common Scoreboard manages the bitmap having the same sender and the same TID as the sender of the data signal (step S1202).

Then, in a case where the Common Scoreboard manages the bitmap having the same sender and the same TID as the sender of the data signal (Yes in step S1202), the AP generates Common Block Ack on the basis of the information of the Common Scoreboard, transmits the Common Block Ack to a STA that is the sender (step S1203), and ends this processing.

On the other hand, in a case where the Common Scoreboard does not manage the bitmap having the same sender and the same TID as the sender of the data signal (No in step S1202), the AP generates conventional Block Ack on the basis of the information of the Link Scoreboard of the link (for example, Link1) on which the data signal has been received, transmits the Block Ack to the STA that is the sender (step S1204), and ends this processing.

Figure 13:
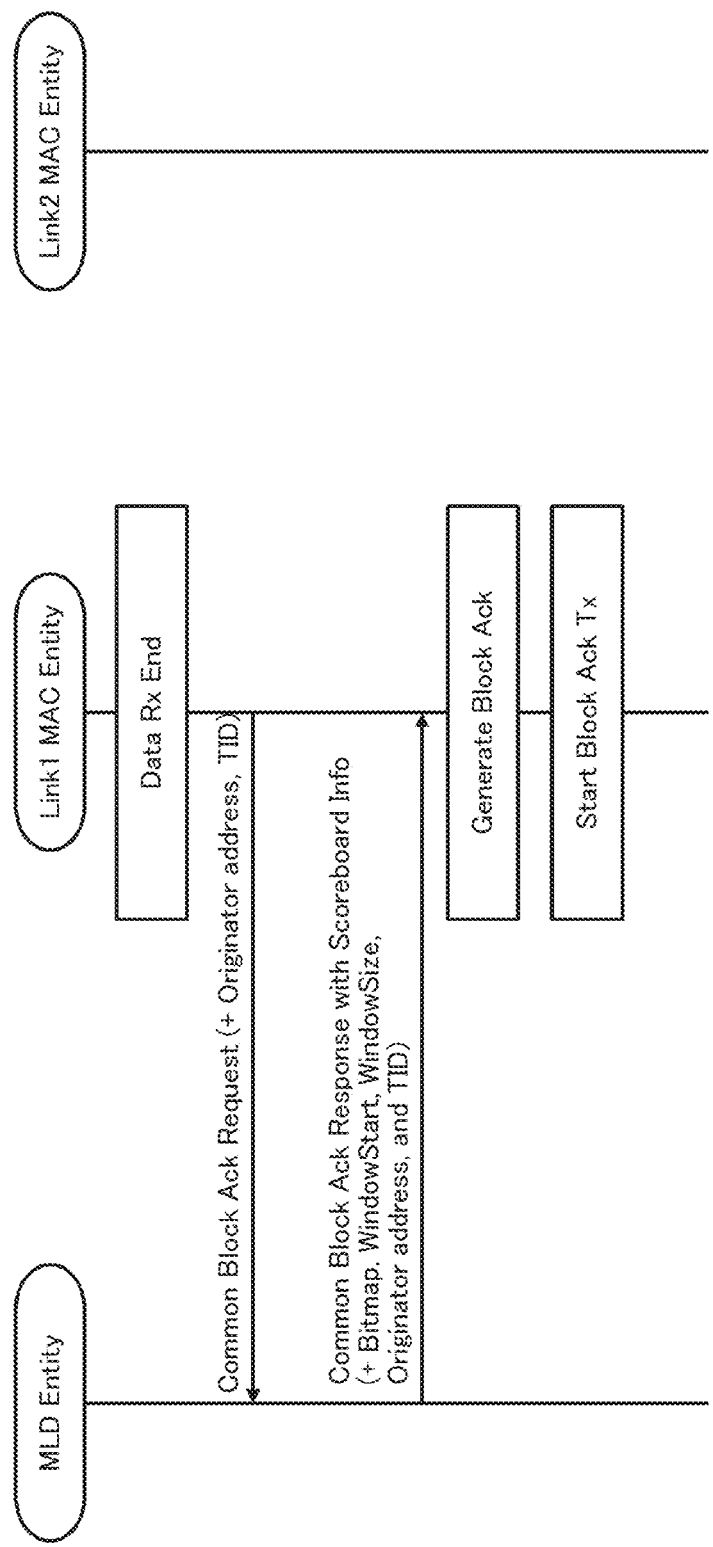
FIG. 13 is a diagram illustrating an example of an internal sequence when the AP transmits the Block Ack.

FIG. 13 illustrates an example of an internal sequence when the AP transmits Block Ack. FIG. 13 illustrates an example of an internal sequence corresponding to step S1203 in the flowchart illustrated in FIG. 12 when the AP transmits Common Block Ack on the basis of the bitmap information of the Common Scoreboard. The MLO-compatible AP includes the Link1 MAC Entity and the Link2 MAC Entity that perform individual data processing for each link and the MLD Entity that performs data processing common to all links. In addition, as scoreboards for storing data acquisition success/failure information in the AP, the Link1 Scoreboard and the Link2 Scoreboard included in the Link1 MAC Entity and the Link2 MAC Entity, respectively, and the Common Scoreboard included in the MLD Entity are provided.

After completing the reception of a data signal on the Link1 (Data Rx End), the Link1 MAC entity notifies the MLD entity of Common Block Ack Request Info including Originator Address and TID.

On the basis of the information of Common Block Ack Request Info acquired from the Link1 MAC Entity, the MLD Entity checks that the bitmap information having the same Originator and the same TID as the sender of the data received on the Link1 is managed by the Common Scoreboard, and notifies the Link1 MAC Entity of Common Block Ack Response Info including Common Scoreboard information (at least bitmap information, WindowStart$_{Rc}$, WindowEnd$_{Rc}$).

The Link1 MAC Entity Generates the Common Block Ack on the basis of the acquired information of the Common Block Ack Response Info (Generate Block Ack) and transmits the Common Block Ack to a STA that is a sender (Start Block Ack Tx).

Figure 14:
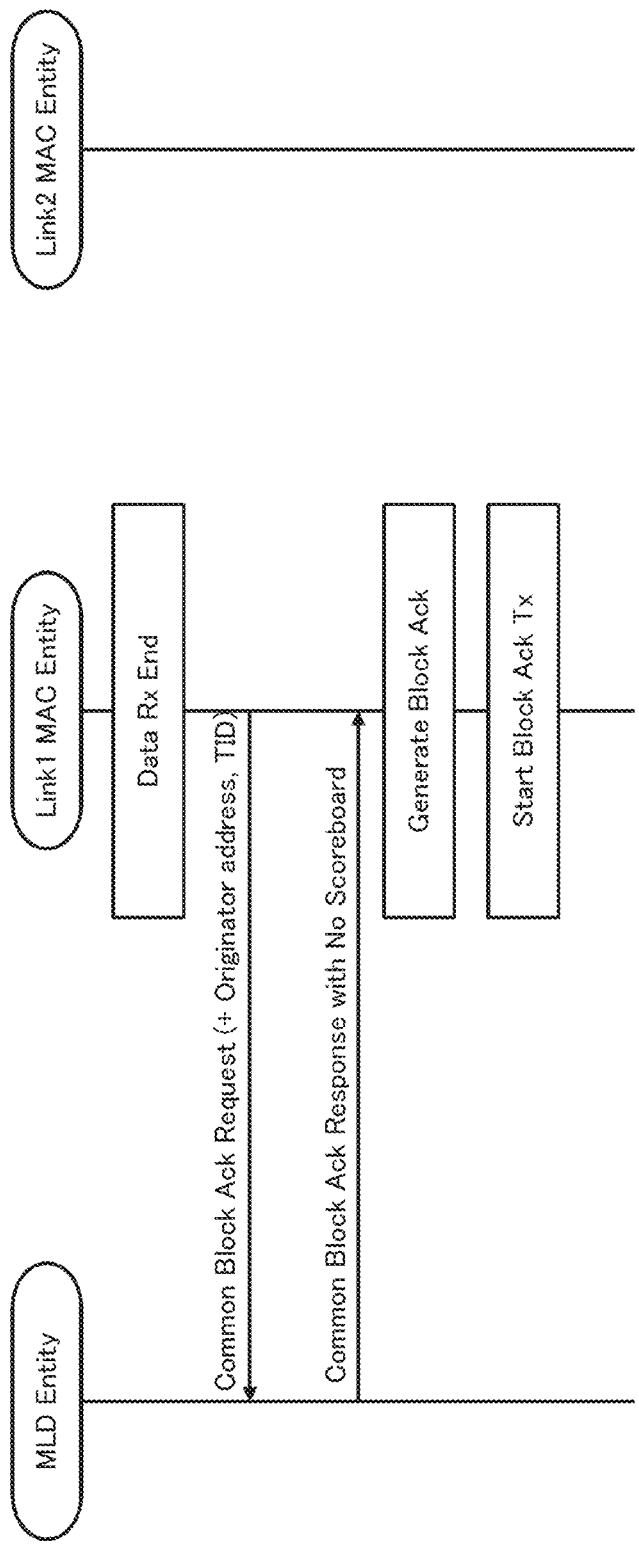
FIG. 14 is a diagram illustrating another example of the internal sequence when the AP transmits the Block Ack.

FIG. 14 illustrates another example of the internal sequence when the AP transmits Block Ack. FIG. 14 illustrates an example of an internal sequence corresponding to step S1204 in the flowchart illustrated in FIG. 12 when the AP transmits conventional Block Ack on the basis of the bitmap information of Link Scoreboard.

After completing the reception of a data signal on the Link1 (Data Rx End), the Link MAC entity notifies the MLD entity of Common Block Ack Request Info including Originator Address and TID.

On the basis of the information of the Common Block Ack Request Info acquired from the Link1 MAC Entity, the MLD Entity checks that the bitmap information having the same Originator and the same TID as the sender of the data received on the Link1 is not managed by the Common Scoreboard, and notifies the Link1 MAC Entity of Common Block Ack Response Info not including Common Scoreboard information.

The Link1 MAC Entity generates a conventional Block Ack on the basis of the Link1 Scoreboard information of the Link1 MAC Entity (Generate Block Ack) and transmits the Block Ack to the STA that is a sender (Start Block Ack Tx).

E-4. Block Ack Request Phase

Next, in the Block Ack Request phase, the STA transmits a Block Ack Request (BAR) frame to the AP on an arbitrary link (link X). In response thereto, the AP transmits a Block Ack frame on the same link (link X). The BAR frame is used not only when the STA wants to acquire the Block Ack but also when the Scoreboard and the Window Start$_R$ are initialized between the AP and the STA.

Figure 15:
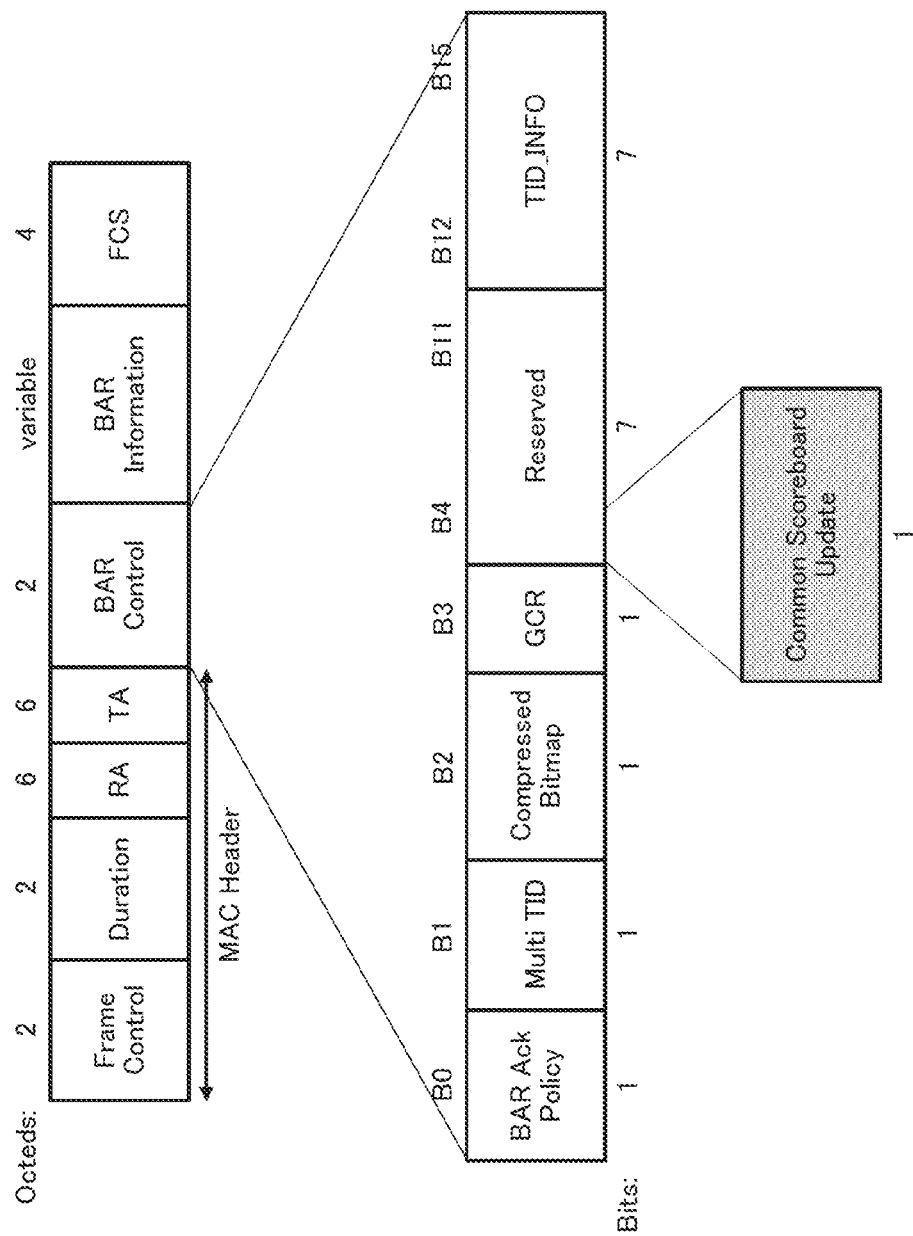
FIG. 15 is a diagram illustrating a configuration example of a Block Ack Request frame.

FIG. 15 illustrates a configuration example of a Block Ack Request (BAR) frame. As described with reference to FIG. 6, the BAR frame is transmitted by the sender (STA) to request the receiver (AP) to transmit Block Ack.

Since the structure of the BAR frame is specified in the IEEE 802.11, detailed description thereof is omitted here. The present embodiment is characterized in that a Common Scoreboard Update subfield is included in a BAR Control field. Specifically, one bit of a Reserved field in the BAR Control field is allocated to the Common Scoreboard Update subfield.

In a case where the sender requests bitmap information of Common Scoreboard of a receiver when transmitting the BAR frame on either link, the sender sets "1" in the Common Scoreboard Update subfield and transmits the BAR frame. Note that, in a case where it is desired to only update the Common Scoreboard of the receiver, the sender may set a Receiver Address (RA) of the BAR frame to a MAC address allocated to the MLD entity of the receiver, and transmit the BA frame.

Figure 16:
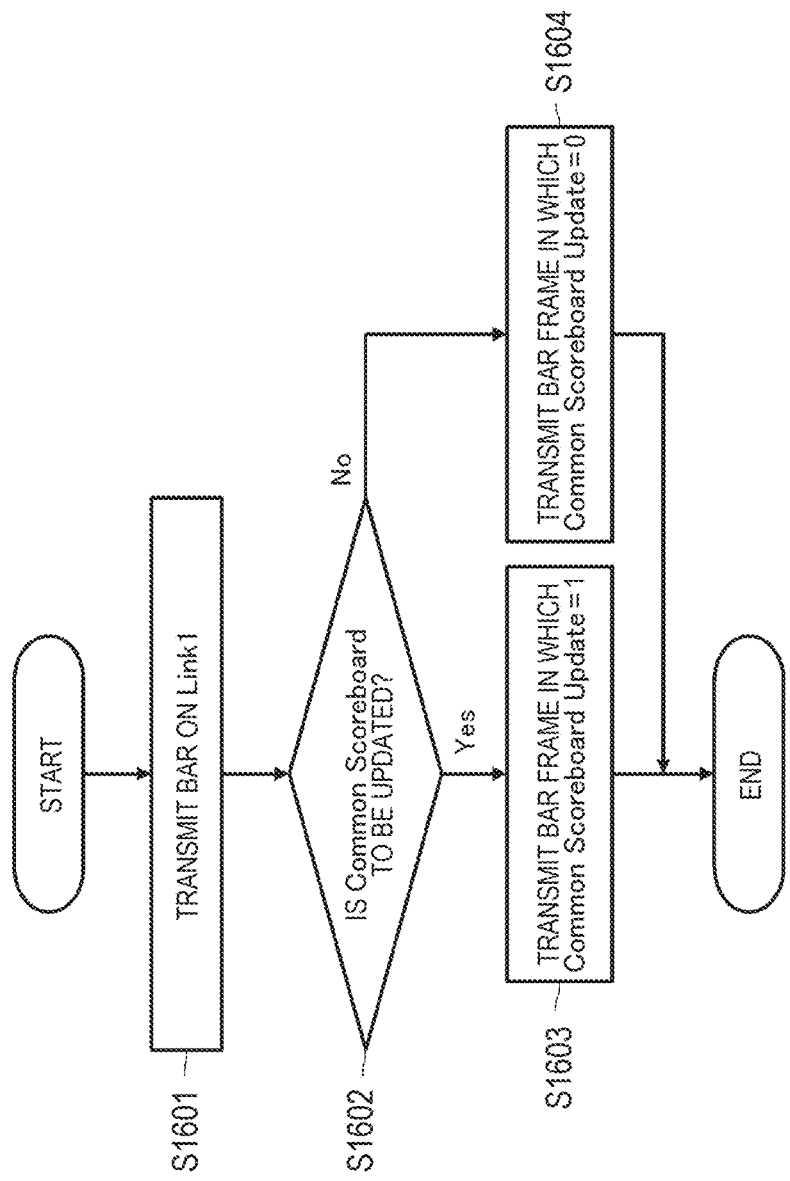
FIG. 16 is a flowchart illustrating a processing procedure when a sender transmits a BAR frame.

FIG. 16 illustrates, as a flowchart, a processing procedure when the sender transmits a BAR frame. Here, the sender is assumed to be a STA that has transmitted a data frame to an AP.

When transmitting BAR on a certain link (for example, Link1) (step S1601), the STA determines whether or not to request update of Common Scoreboard simultaneously with Link Scoreboard (step S1602).

Then, in a case where the update of the Common Scoreboard is requested (Yes in step S1602), the STA sets "1" in the Common Block Ack Update subfield of the BAR frame and transmits the BAR frame (step S1603).

On the other hand, in a case where the update of the Common Scoreboard is not requested (No in step S1602), the STA sets "0" in the Common Block Ack Update subfield of the BAR frame and transmits the BAR frame (step S1604).

Figure 17:
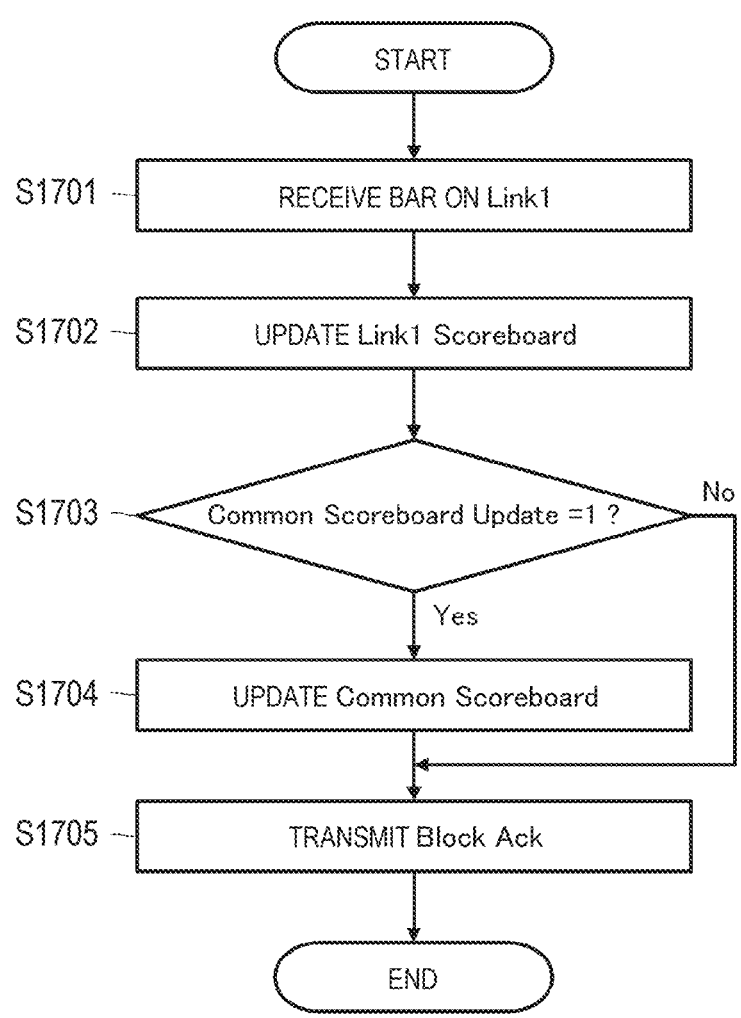
FIG. 17 is a flowchart illustrating a processing procedure when a receiver receives the BAR frame.

FIG. 17 illustrates, as a flowchart, a processing procedure when the receiver receives a BAR frame. Here, the receiver is assumed to be an AP that has received a data frame from a STA.

When receiving the BAR frame on a certain link (for example, Link1) (step S1701), the AP updates Link Scoreboard corresponding to the link on which the BAR has been received (step S1702).

Next, the AP checks whether or not "1" is set in the Common Scoreboard Update subfield of the BAR frame received in step S1701 (step S1703).

Then, in a case where "1" is set in the Common Scoreboard Update subfield (Yes in step S1703), the AP updates the Common Scoreboard (step S1704) and then transmits Block Ack (step S1705). The processing of updating Common Scoreboard is performed in accordance with, for example, a processing procedure similar to that at the time of data reception illustrated in FIG. 9.

On the other hand, in a case where "0" is set in the Common Scoreboard Update subfield (No in step S1703) the AP transmits Block Ack without updating the Common Scoreboard (step S1705).

Figure 18:
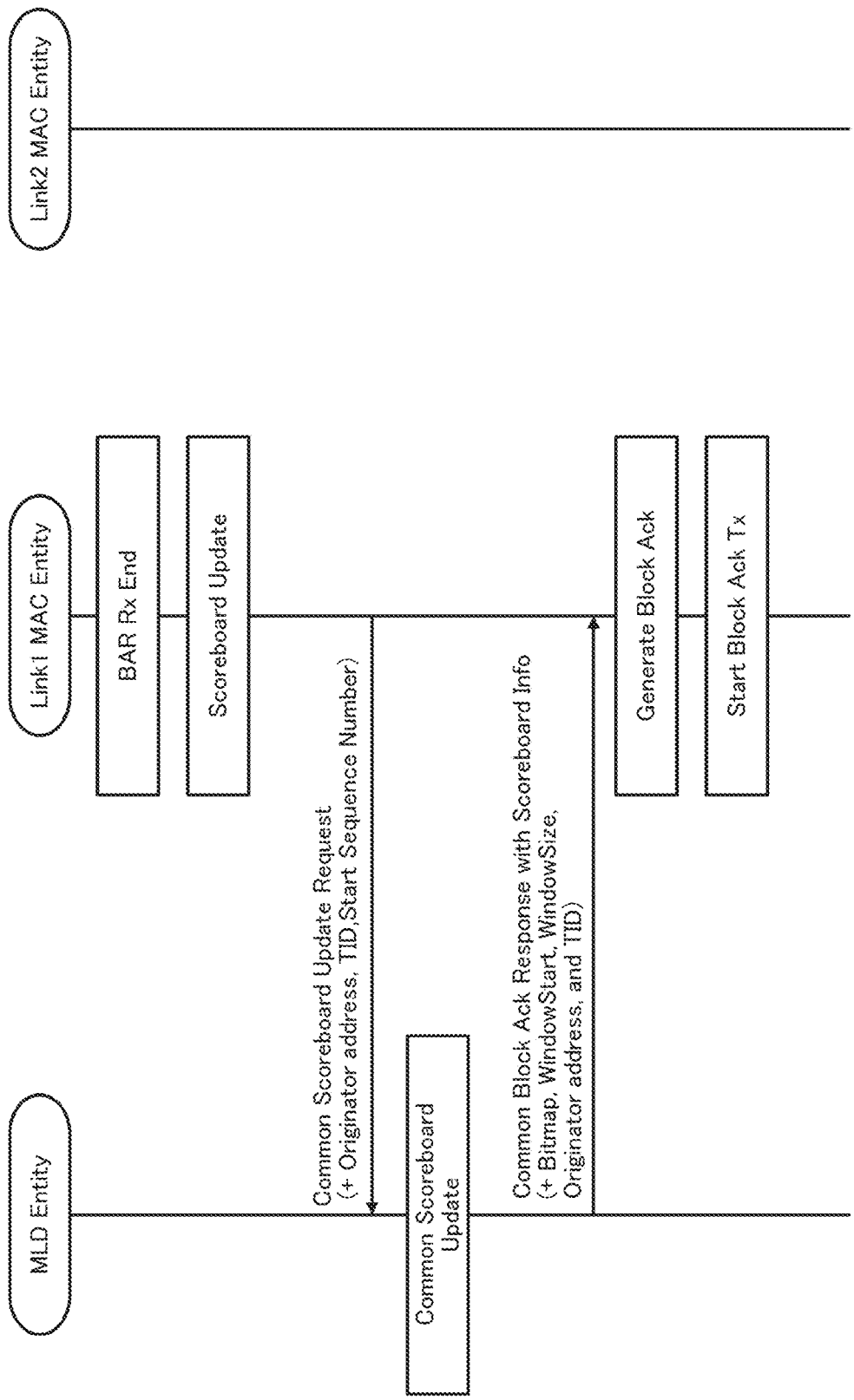
FIG. 18 is a diagram illustrating an example of an internal sequence when the receiver receives the BAR frame.

FIG. 18 illustrates an example of an internal sequence when the receiver receives a BAR frame. FIG. 18 corresponds to a case where in the determination step of step S1703 in the flowchart illustrated in FIG. 17, Common Scoreboard Update=1 and thus Common Scoreboard is updated in step S1704. Here, it is assumed that the AP, which is a receiver, receives the BAR frame on the Link1 and then transmits Block Ack on the Link1. The AP is an MLO-compatible communication device, that is, an MLD, and includes the Link1 MAC Entity and the Link2 MAC Entity that perform individual data processing for each link and the MLD Entity that performs data processing common to all links as illustrated in FIG. 3.

When completing the processing of receiving the BAR frame (BAR Rx End), the Link1 MAC Entity updates the Link1 Scoreboard of the Link1 MAC Entity (Scoreboard Update).

Next, when checking that "1" is set in the Common Scoreboard Update subfield of the BAR frame, the Linker MAC Entity transmits Common Scoreboard Update Request including Originator Address, TID, and Start Sequence Number (SSN) to the MLD Entity.

The MLD Entity updates the Common Scoreboard on the basis of the information included in the Common Scoreboard Update Request from the Link1 MAC entity (Common Scoreboard Update). Thereafter, the MLD Entity transmits a Common Block Ack Response frame including information of the Common Scoreboard (bitmap information), WindowStart, WindowSize, Originator Address, and TID to the Link1 MAC Entity.

The Link1 MAC Entity Generates Block Ack on the basis of information included in the Common Block Ack.

Response from the AP (Generate Block Ack) and starts to transmit the Block Ack (Start Block Ack Tx).

Here, in updating the scoreboard in response to the Block Ack Request, the following rules are applied to both the Link1 Scoreboard and the Common Scoreboard.

<Case Where BAR to Same Sender and Same TID>
(1) Case Where WindowStart$_R$≤SSN≤WindowEnd$_R$
(1-1) Set WindowStart$_R$=SSN
(1-2) Set bitmap from WindowEnd$_R$+1 to WindowStart$_R$+WindowSize$_R$−1 to "0"
(1-3) Set WindowEnd$_R$=WindowStart$_R$+WindowSize$_R$−1
(2) Case Where WindowEnd$_R$<SN≤WindowStart$_R$+$2^{11}$
(2-1) Set WindowStart$_R$=SSN
(2-2) Set WindowEnd$_R$=WindowStart$_R$+WindowSize$_R$−1
(2-3) Set bitmap from WindowStart$_R$ to WindowEnd$_{RC}$ to "0"
(3) If WindowStart$_{Rc}$+$2^{11}$<SN≤WindowStart$_{Rc}$, do not update <Case Where BAR to Another Sender or Another TID>
(1) Set WindowStart$_R$=SSN
(2) Set bitmap from WindowEnd$_R$+1 to WindowStart$_R$+WindowSize$_R$−1 to "0"
(3) Create a bitmap of the size of WindowSize$_R$ in such a manner that the start is WindowStart$_R$ and the end is WindowEnd$_R$.

E-5. Operation Example

In the first example, generation of Common. Block Ack is achieved in an MLO-compatible communication system on the basis of Partial-state Common Scoreboard. In this section, an operation example in the first example will be described.

Figure 19:
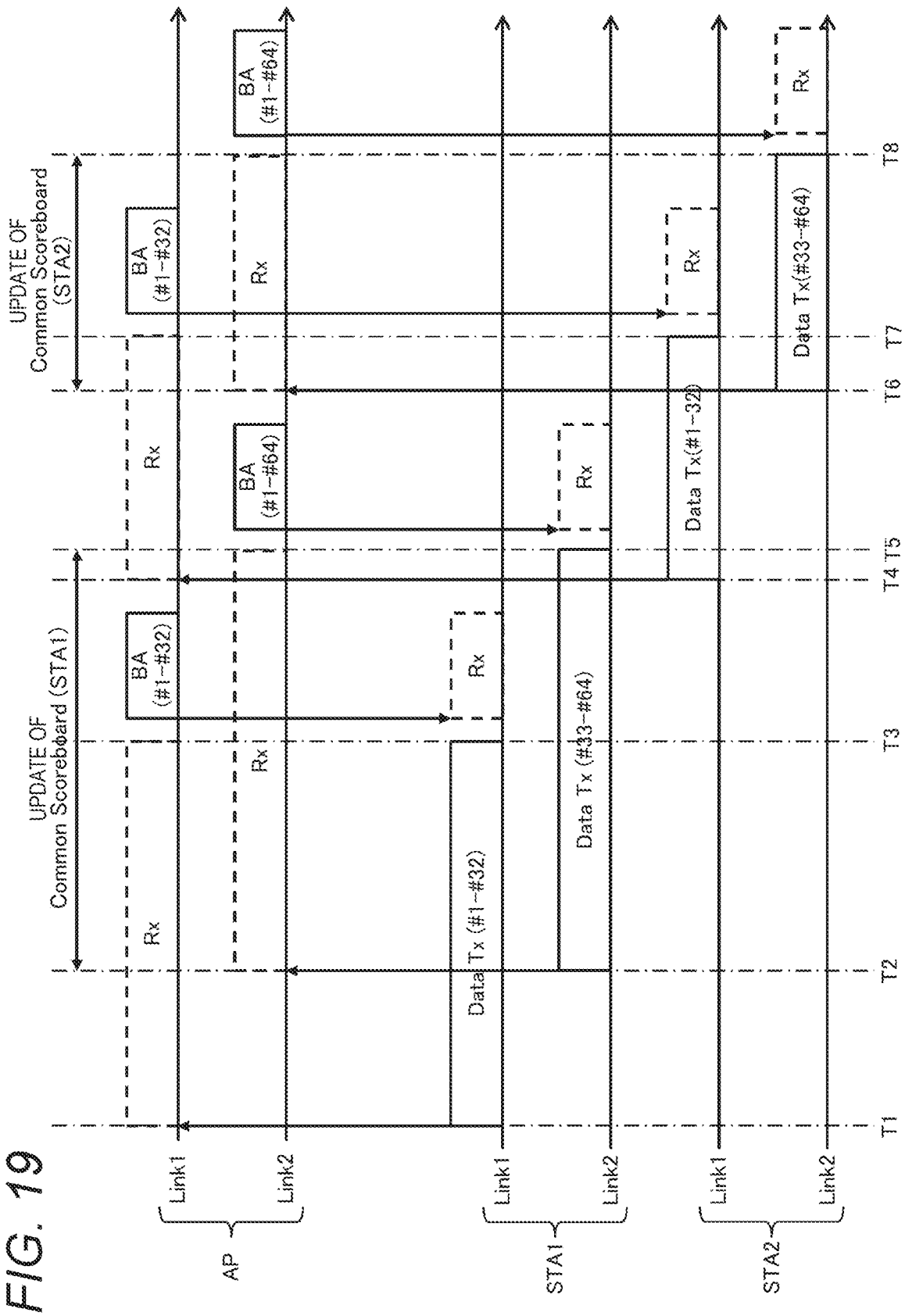
FIG. 19 is a diagram illustrating an example (first example) of a communication sequence of the multi-link operation.

FIG. 19 illustrates an example of a communication sequence of the multi-link operation performed in the communication system illustrated in FIG. 1. In the example of the communication sequence illustrated in FIG. 19, the STA1 and the STA2 perform data transmission to the AP using the Link1 and the Link2.

Note that the horizontal axis in FIG. 19 is a time axis, and indicates a communication operation at each time on each link of the AP, the STA1, and the STA2. The square block drawn by a solid line represents a transmission frame at a corresponding communication device, link, and time, the arrow in a vertical solid line indicates frame transmission to a destination, and the square block drawn by a dotted line represents a reception frame.

Figure 20:
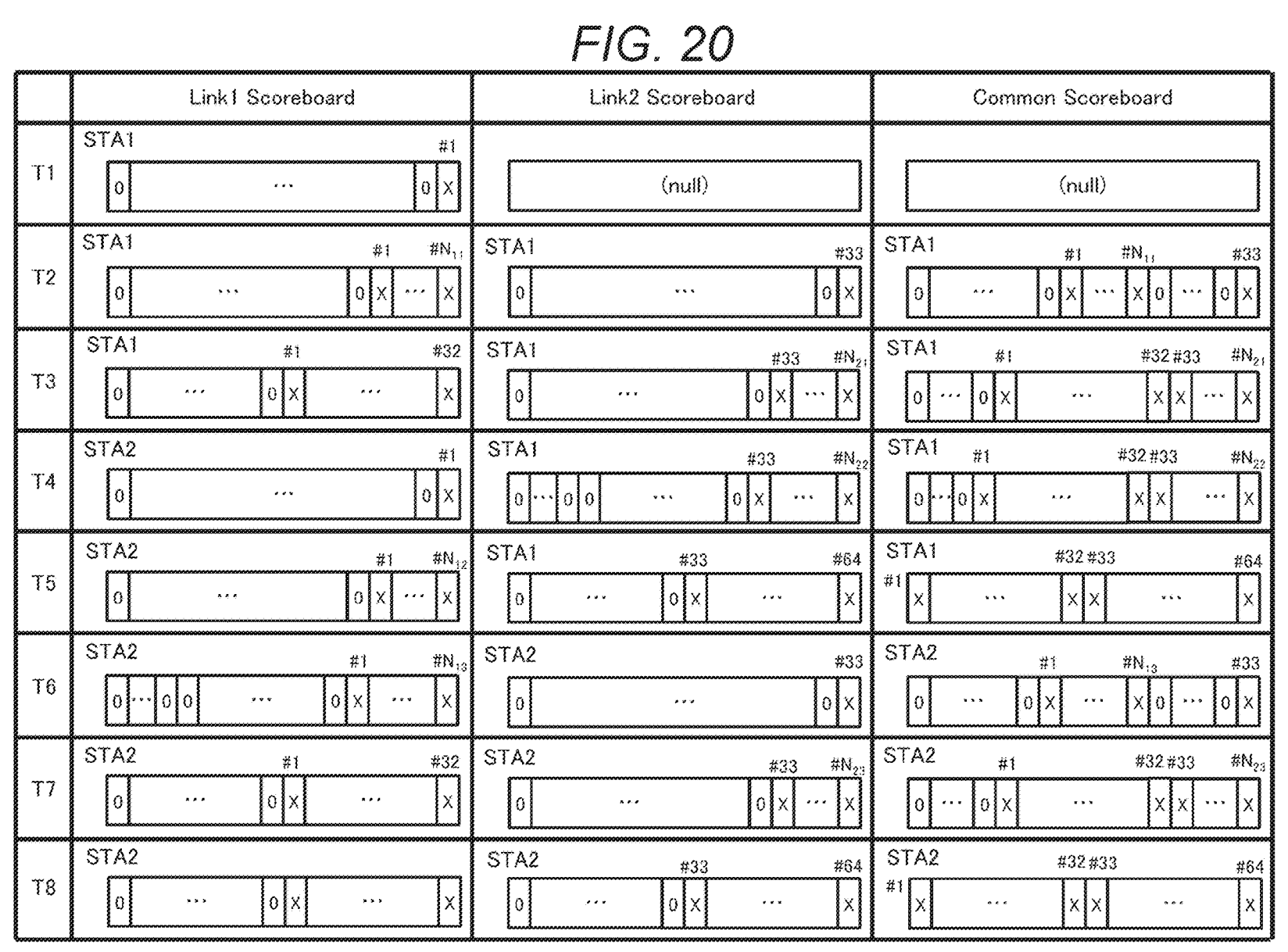

Furthermore, FIG. 20 illustrates notation of bitmap information at each time (T1 to T8) of Link1 MAC Entity and Common Scoreboard of each link in the AP when the communication sequence illustrated in FIG. 19 is performed. The Link1 MAC Entity and the Common Scoreboard of each link are Partial-state cache memories in which packet acquisition success/failure information in one Block Ack Session can be temporarily stored. Information matching SN indicated by WindowStart$_R$ is stored at the left end of the bitmap information of each scoreboard, whereas information matching SN indicated by WindowEnd$_R$ is stored at the right end. At each bit position of each piece of bitmap information, acquisition success/failure information of the packet with the corresponding SN is represented by 0 and 1. The SN of the packet that has not yet been received is represented by "0". In addition, the SN of the already acquired packet is represented by "X", and it is assumed that either 0 or 1 is stored in X depending on the success or failure of the acquisition of the packet.

In FIG. 20, it is assumed that WindowSize=64, packets with SN #1 to #32 are transmitted on the Link1, and data with SN #33 to #64 are transmitted on the Link2 in both the STA1 and the STA2 (that is, it is assumed that each of the STA1 and the STA2 distributes and transmits packets whose number corresponds to a window size to the Link1 and the Link2). However, the present disclosure is not limited to the above assumption, and for example, different numbers of packets may be included in the Link1 and the Link2, or packets whose number is less than WindowSize may be transmitted.

In addition, in general, when TIDs are different from each other even for the same sender (Originater Address), different sender information is managed by the scoreboard as another Block Ack Session. In FIGS. 19 and 20, in order to simplify the description, it is assumed that only data of the same TID is transmitted from each sender (STA1, STA2) and is managed by the scoreboard as one Block Ack Session.

Hereinafter, the communication sequence illustrated in FIG. 19 will be described with reference to the status of each scoreboard illustrated in FIG. 20.

When acquiring the transmission right of the Link1 at time T1, the STA1 starts to transmit a data signal obtained by aggregating the packets with SN #1 to #32, and completes the transmission of the aggregated data signal at time T3. During the period from the time T1 to the time T3, bitmap information related to the success/failure of acquisition of the packets with SN #1 to #32 transmitted from the STA1 is stored in the Link1 Scoreboard and is sequentially updated.

Furthermore, when acquiring the transmission right of the Link2 at time T2, the STA1 starts to transmit a data signal obtained by aggregating packets with the same TID as the Link1 and with SN #33 to #64, and completes the transmission of the aggregated data signal at time T5. During the period from the time T2 to the time T5, bitmap information related to the success/failure of acquisition of the packets with SN #33 to #64 transmitted from the STA1 is stored in the Link2 Scoreboard and is sequentially updated.

On the other hand, the STA2 acquires the transmission right of the Link1 at time T4. That is, at the time T4, the sender on the Link1 changes from the STA1 to the STA2. The STA2 starts to transmit the data signal obtained by aggregating the packets with SN #1 to #32, and completes the transmission of the aggregated data signal at time T7. After the time T4, the bitmap information related to the success/failure of acquisition of the packets with SN #1 to #32 transmitted from the STA2 is stored in the Link1 Scoreboard and is sequentially updated.

Further, the STA2 acquires the transmission right of the Link2 at time T6. That is, at the time T6, the sender on the Link2 changes from the STA1 to the STA2. The STA2 starts to transmit the data signal obtained by aggregating the packets with the same TID as the Link1 and with SN #33 to #64 on the Link2, and completes the transmission of the aggregated data signal at time T8. After the time T6, the bitmap information related to the success/failure of acquisition of the packets with SN #33 to #64 transmitted from the STA2 is stored in the Link2 Scoreboard and is sequentially updated.

The MLD Entity of the AP updates the Common Scoreboard in accordance with the update rule described above.

Therefore, the AP receives the data signal from the STA1 on both the Link1 and the Link2, and at the time T2 when both the Link1 Scoreboard and the Link1 Scoreboard manage the bitmap information of the STA1 having the same sender and the same TID, the Common Scoreboard is updated, and the bitmap information related to the success/failure of acquisition of the packets from the STA1 is stored.

Then, even after the time T4 when the sender on the Link1 changes from the STA1 to the STA2, the bitmap information related to the success/failure of acquisition of the packets from the STA1 is stored in the Link2 Scoreboard. Therefore, during the period from the time T2 to T5, the bitmap information related to the success/failure of acquisition of the packets from the STA1 is continuously updated in the Common Scoreboard. As a result, at the time T5 when the data transmission by the STA1 on the Link2 ends, the bitmap information (that is, acquisition success/failure information of the sender and the TID that have completed transmission) related to the success/failure of acquisition of the packets with SN #1 to #64 transmitted from the STA1 on the Link1 and the Link2 is stored in the Common Scoreboard. Therefore, the AP can transmit the Common Block Ack to the STA1 on the Link2 in accordance with the Block Ack transmission procedure illustrated in FIG. 12.

On the other hand, at the time T6, the AP receives the data signal from the STA2 on both the Link1 and the Link2, and both the Link1 Scoreboard and the Link1 Scoreboard manage the bitmap information of the STA2 having the same sender and the same TID. Therefore, switching is performed in such a manner that the bitmap information related to the success/failure of acquisition of the packets from the STA2 is stored in the Common Scoreboard. During the period from the time T6 to time T8, the bitmap information related to the success/failure of acquisition of the packets from the STA2 is continuously updated in the Common Scoreboard. At this time, depending on the memory capacity of the Common Scoreboard, the bitmap information related to the STA1 stored so far is deleted (As in the present embodiment, on the assumption that the Common Scoreboard is a Partial-state cache memory that can store the packet acquisition success/failure information in one Block Ack Session, the bitmap information related to the STA1 is deleted by overwriting.).

Thereafter, at the time T8 when the data transmission by the STA2 on the Link2 ends, the bitmap information (that is, acquisition success/failure information of the sender and the TID that have completed transmission) related to the success/failure of acquisition of the packets with SN #1 to #64 transmitted from the STA2 on the Link1 and the Link2 is stored in the Common Scoreboard. Therefore, the AP can transmit the Common Block Ack to the STA2 on the Link2 in accordance with the Block Ack transmission procedure illustrated in FIG. 12.

Figure 21:
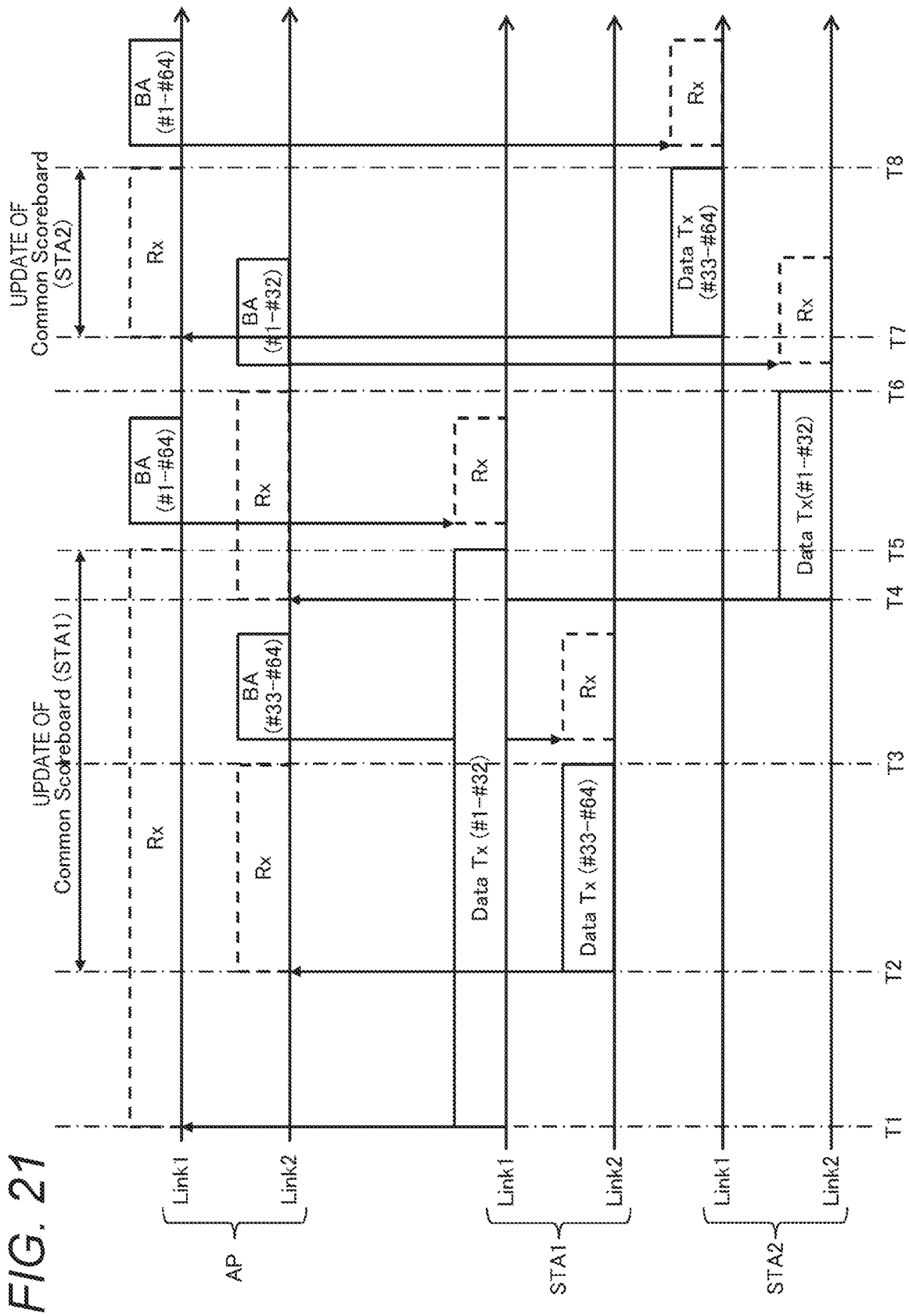
FIG. 21 is a diagram illustrating another example (first example) of the communication sequence of the multi-link operation.
Figure 22:
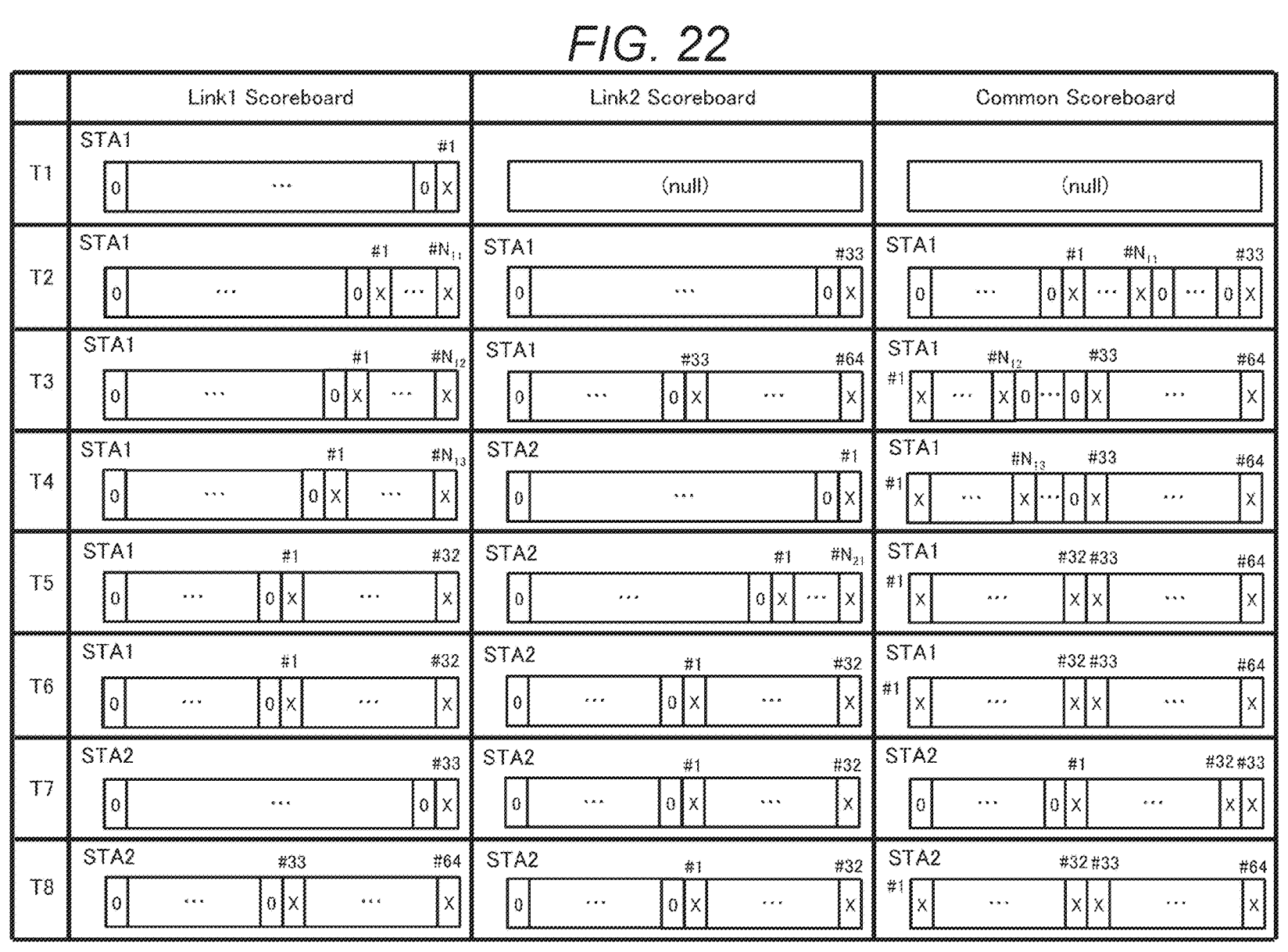

FIG. 21 illustrates another example of the communication sequence of the multi-link operation performed in the communication system illustrated in FIG. 1. Furthermore, FIG. 22 illustrates a status of each scoreboard in the AP at each time at the time of performing the communication sequence illustrated in FIG. 21.

When acquiring the transmission right of the Link1 at the time T1, the STA1 starts to transmit a data signal obtained by aggregating the packets with SN #1 to #32, and completes the transmission of the aggregated data signal at the time T5. During the period from the time T1 to the time T5, bitmap information related to the success/failure of acquisition of the packets with SN #1 to #32 transmitted from the STA1 is stored in the Link1 Scoreboard and is sequentially updated.

Furthermore, when acquiring the transmission right of the Link2 at time T2, the STA1 starts to transmit a data signal obtained by aggregating packets with the same TID as the Link1 and with SN #33 to #64, and completes the transmission of the aggregated data signal at time T3. During the period from the time T2 to the time T3, bitmap information related to the success/failure of acquisition of the packets with SN #33 to #64 transmitted from the STA1 is stored in the Link2 Scoreboard and is sequentially updated.

On the other hand, the STA2 acquires the transmission right of the Link2 at time T4. That is, at the time T4, the sender on the Link2 changes from the STA1 to the STA2. The STA2 starts to transmit the data signal obtained by aggregating the packets with SN #1 to #32, and completes the transmission of the aggregated data signal at time T6. After the time T4, the bitmap information related to the success/failure of acquisition of the packets with SN #1 to #32 transmitted from the STA2 is stored in the Link2 Scoreboard and is sequentially updated.

Further, the STA2 acquires the transmission right of the Link1 at time T7. That is, at the time T7, the sender on the Link1 changes from the STA1 to the STA2. The STA2 starts to transmit the data signal obtained by aggregating the packets with the same TID as the Link2 and with SN #33 to #64, and completes the transmission of the aggregated data signal at time T8. After the time T7, the bitmap information related to the success/failure of acquisition of the packets with SN #33 to #64 transmitted from the STA2 is stored in the Link1 Scoreboard and is sequentially updated.

The MLD Entity of the AP updates the Common Scoreboard in accordance with the update rule described above.

Therefore, the AP receives the data signal from the STA1 on both the Link1 and the Link2, and at the time T2 when both the Link1 Scoreboard and the Link1 Scoreboard manage the bitmap information of the STA1 having the same sender and the same TID, the Common Scoreboard is updated, and the bitmap information related to the success/failure of acquisition of the packets from the STA1 is stored.

Then, even after the time T4 when the sender on the Link2 changes from the STA1 to the STA2, the acquisition success/failure information of the packets from the STA1 is stored in the Common Scoreboard and the Link1 Scoreboard. Therefore, during the period from the time T2 to T5, the bitmap information related to the success/failure of acquisition of the packets from the STA1 is continuously updated in the Common Scoreboard. As a result, at the time T5 when the data transmission by the STA1 on the Link1 ends, the bitmap information (that is, acquisition success/failure information of the sender and the TID that have completed transmission) related to the success/failure of acquisition of the packets with SN #1 to #64 transmitted from the STA1 on the Link1 and the Link2 is stored in the Common Scoreboard. Therefore, the AP can transmit the Common Block Ack to the STA1 on the Link1 in accordance with the Block Ack transmission procedure illustrated in FIG. 12.

On the other hand, at the time T7, the AP receives the data signal from the STA2 on the Link1, and both the Link1 Scoreboard and the Link1 Scoreboard manage the bitmap information of the STA2 having the same sender and the same TID. Therefore, switching is performed in such a manner that the bitmap information related to the success/failure of acquisition of the packets from the STA2 is stored in the Common Scoreboard. During the period from the time T7 to time T8, the bitmap information related to the success/failure of acquisition of the packets from the STA2 is continuously updated in the Common Scoreboard. At this time, depending on the memory capacity of the Common Scoreboard, the bitmap information related to the STA1 stored so far is deleted. As in the present embodiment, on the assumption that the Common Scoreboard is a Partial-state cache memory that can store the packet acquisition success/failure information in one Block Ack Session, the bitmap information related to the STA1 is deleted by overwriting.

Thereafter, at the time T8 when the data transmission by the STA2 on the Link2 ends, the bitmap information (that is, acquisition success/failure information of the sender and the TID that have completed transmission) related to the success/failure of acquisition of the packets with SN #1 to #64 transmitted from the STA2 on the Link1 and the Link2 is stored in the Common Scoreboard. Therefore, the AP can transmit the Common Block Ack to the STA2 on the Link2 in accordance with the Block Ack transmission procedure illustrated in FIG. 12.

As illustrated an FIG. 21, the STA1 starts data transmission first on the Link1, and then starts data transmission with the same TID on the Link2. However, in a case where the data transmission ends earlier on the Lnk2 than on the Link1, that is, even if the data transmission start time and the data transmission end time are reversed between links, the AP can generate and transmit Common Block Ack to the STA1 by updating the Common Scoreboard in accordance with the update rule according to the present disclosure. Furthermore, in the STA2, the transmission time of the data with the same TID on the Link1 does not overlap with the transmission time of the data with the same TID on the Link2, but the AP can generate and transmit the Common Block Ack to the STA2 by updating the Common Scoreboard in accordance with the update rule according to the present disclosure.

Figure 23:
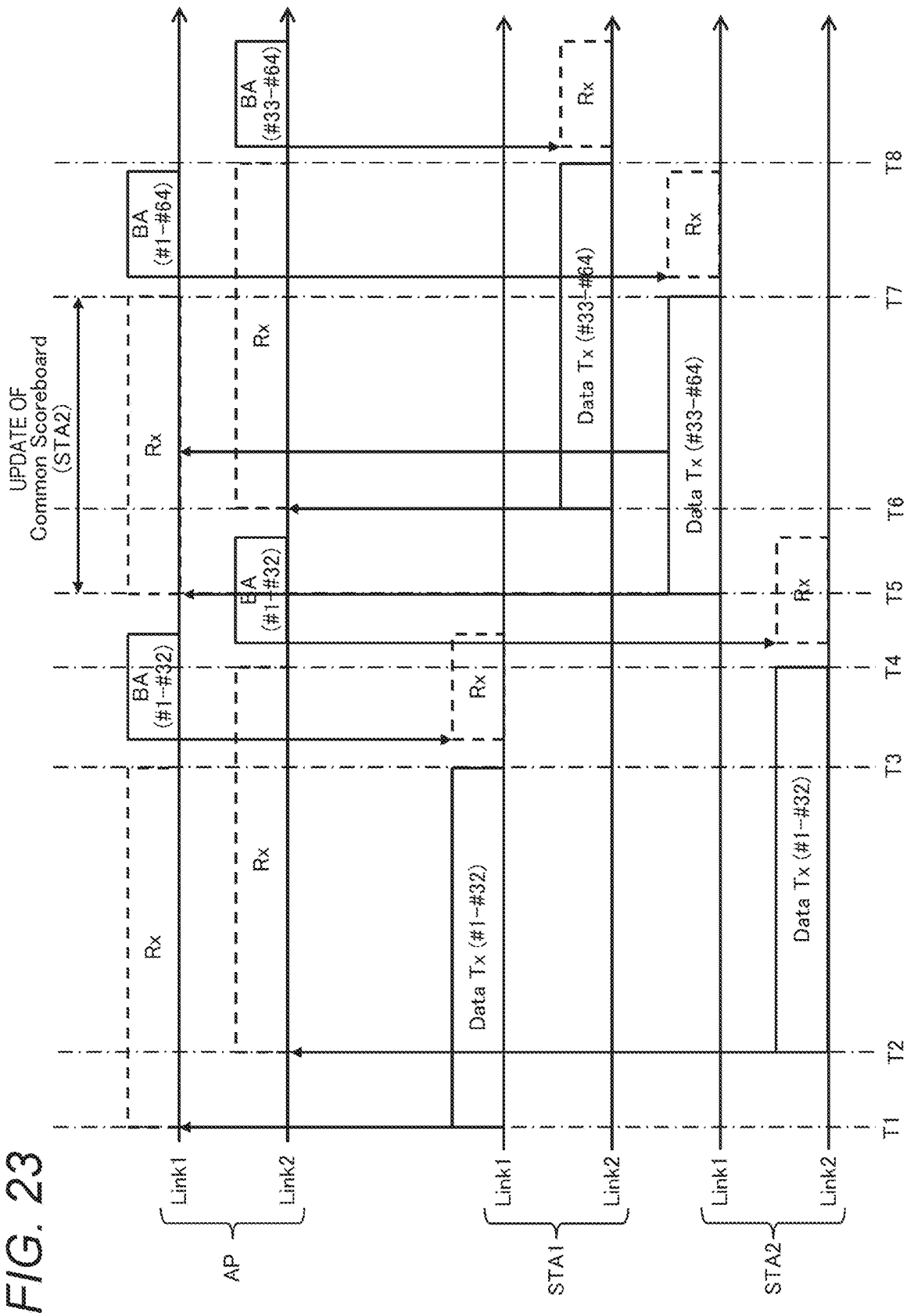
FIG. 23 is a diagram illustrating still another example (first example) of the communication sequence of the multi-link operation.
Figure 24:
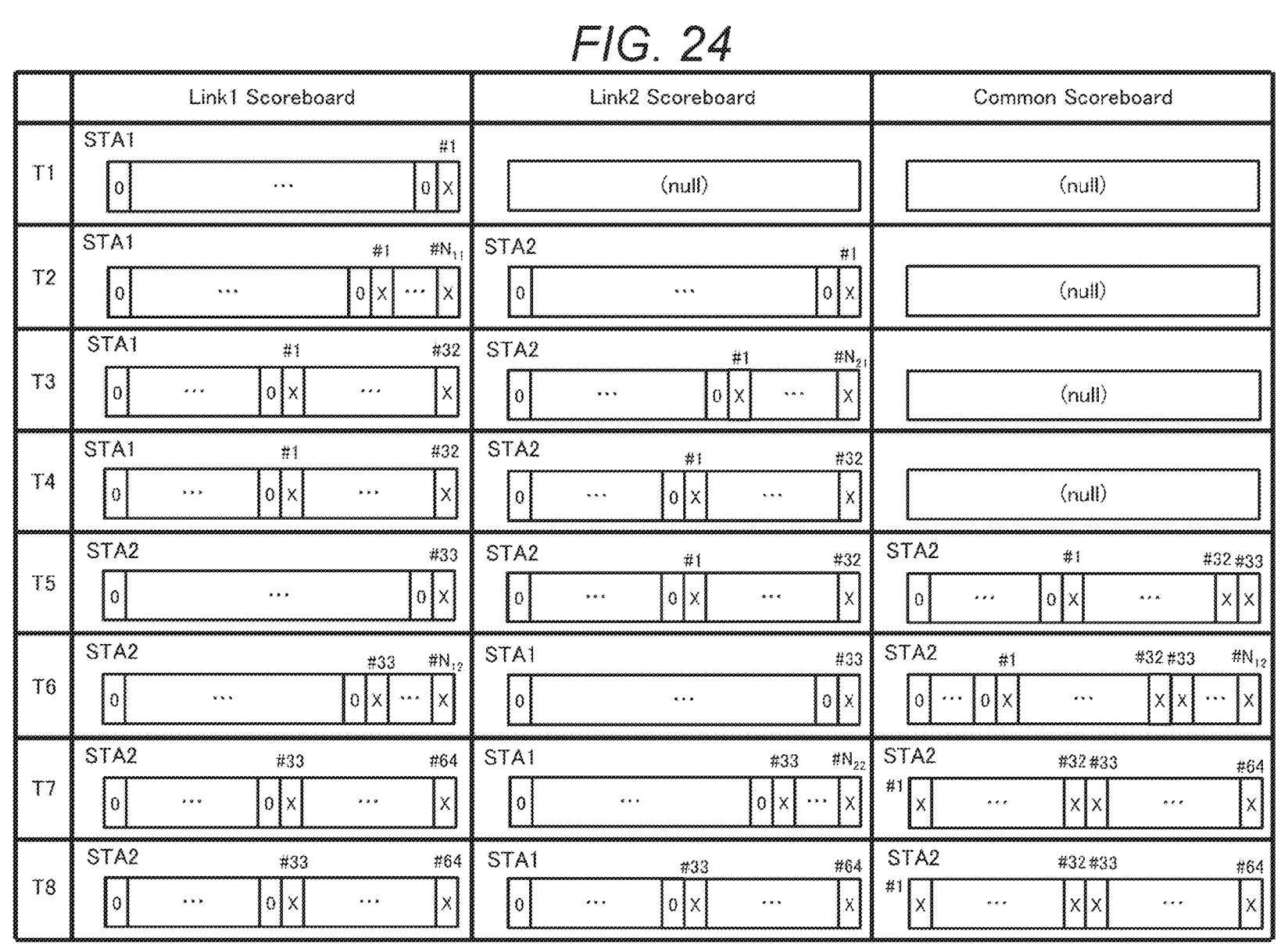

FIG. 23 illustrates still another example of the communication sequence of the multi-link operation performed in the communication system illustrated in FIG. 1. Furthermore, FIG. 24 illustrates a status of each scoreboard in the AP at each time at the time of performing the communication sequence illustrated in FIG. 23.

When acquiring the transmission right of the Link1 at time T1, the STA1 starts to transmit a data signal obtained by aggregating the packets with SN #1 to #32, and completes the transmission of the aggregated data signal at time T3. During the period from the time T1 to the time T3, bitmap information related to the success/failure of acquisition of the packets with SN #1 to #32 transmitted from the STA1 is stored in the Link1 Scoreboard and is sequentially updated.

When acquiring the transmission right of the Link2 at time T2, the STA2 starts to transmit the data signal obtained by aggregating the packets with SN #1 to #32, and completes the transmission of the aggregated data signal at the time T4. During the period from the time T2 to the time T4, bitmap information related to the success/failure of acquisition of the packets with SN 1 to #32 transmitted from the STA2 is stored in the Link2 Scoreboard and is sequentially updated.

Further, the STA2 acquires the transmission right of the Link1 at time T5. That is, at the time T5, the sender on the Link1 changes from the STA1 to the STA2. The STA2 starts to transmit a data signal obtained by aggregating the packets with the same TID as the Link2 and with SN #33 to #64, and completes the transmission of the aggregated data signal at time T7. After the time T5, the bitmap information related to the success/failure of acquisition of the packets with SN #33 to #64 transmitted from the STA2 is stored in the Link1 Scoreboard and is sequentially updated.

On the other hand, the STA1 acquires the transmission right of the Link2 at time T6. That is, at the time T6, the sender on the Link2 changes from the STA2 to the STA1. The STA1 starts to transmit the data signal obtained by aggregating the packets with the same TID as the Link1 and with SN #33 to #64, and completes the transmission of the aggregated data signal at time T8. After the time T6, the bitmap information related to the success/failure of acquisition of the packets with SN #33 to #64 transmitted from the STA1 stored in the Link2 Scoreboard and is sequentially updated.

The MLD Entity of the AP updates the Common Scoreboard in accordance with the update rule described above. Therefore, at the time T5 when both the Link1 Scoreboard and the Link2 Scoreboard manage the bitmap information of the STA2 having the same sender and the same TID, in the AP, the Common Scoreboard is updated, and the bitmap information related to the success/failure of acquisition of the packets from the STA2 is stored.

Then, also at the time T6 when the sender on the Link2 changes from the STA2 to the STA1, the information stored in the Common Scoreboard is the bitmap information related to the success/failure of acquisition of the packets from the STA2. Therefore, at the time T7 when the data transmission by the STA2 on the Link1 ends, the bitmap information (that is, acquisition success/failure information of the sender and the ID that have completed transmission) related to the success/failure of acquisition of the packets with SN #1 to #64 transmitted from the STA2 on the Link1 and the Link2 is stored in the Common Scoreboard. As a result, the AP can transmit the Common Block Ack to the STA2 on the Link1 in accordance with the Block Ack transmission procedure illustrated in FIG. 12.

On the other hand, at the time T6, the AP receives the data signal from the STA1 on the Link1. The Link1 Scoreboard manages the bitmap information of the STA1, whereas the Link2 Scoreboard manages the bitmap information of the STA2. Since the sender is not the same, the Common Scoreboard is not updated. Therefore, at the time T8 when the data transmission by the STA1 on the Link1 ends, the bitmap information (that is, acquisition success/failure information having a different sender and a different TID from those at the time of completion of transmission) related to the success/failure of acquisition of the packets with SN #1 to #64 transmitted from the STA2 on the Link1 and the Link2 remains stored in the Common Scoreboard. As a result, the AP cannot generate the Common Block Ack in accordance with the Block Ack transmission procedure illustrated in FIG. 12, and transmits normal Block Ack to the STA1 on the Link2.

In the examples illustrated in FIGS. 23 and 24, both the STA1 and the STA2 transmit data to the AP using the Link1 and the Link2 and the STA1 starts data transmission first, but the STA2 ends the data transmission first. That is, the data transmission start time and the data transmission end time are reversed between the STA1 and the STA2. In such a case, since the acquisition success/failure information in the entire Block Ack Session of the STA1 whose data transmission end time is late is not stored in the Common Scoreboard, the AP cannot generate and transmit the Common Block Ack to the STA1.

F. SECOND EXAMPLE

In the first example, the method of generating Common Block Ack on the basis of Partial-state Common Scoreboard has been described. However, as described with reference to FIGS. 23 and 24, there is a case where the Common Block Ack cannot be generated and transmitted to some senders (STA). In the examples illustrated in FIGS. 23 and 24, both the STA1 and the STA2 transmit data to the AP using the Link1 and the Link2, but the data transmission start time and the data transmission end time are reversed between the STA1 and the STA2, and thus the AP cannot generate and transmit the Common Block Ack to the STA1 whose data transmission end time is late.

In the Partial-state Common Scoreboard, it is also possible to simultaneously store bitmap information having a plurality of senders or a plurality of TIDs depending on a mounted memory. Therefore, as a second example, the method of updating a scoreboard of each link on the basis of the bitmap information of the Common Scoreboard under the condition that the Partial-state Common Scoreboard can simultaneously store the bitmap information having a plurality of senders or a plurality of TIDs will be described below.

Figure 25:
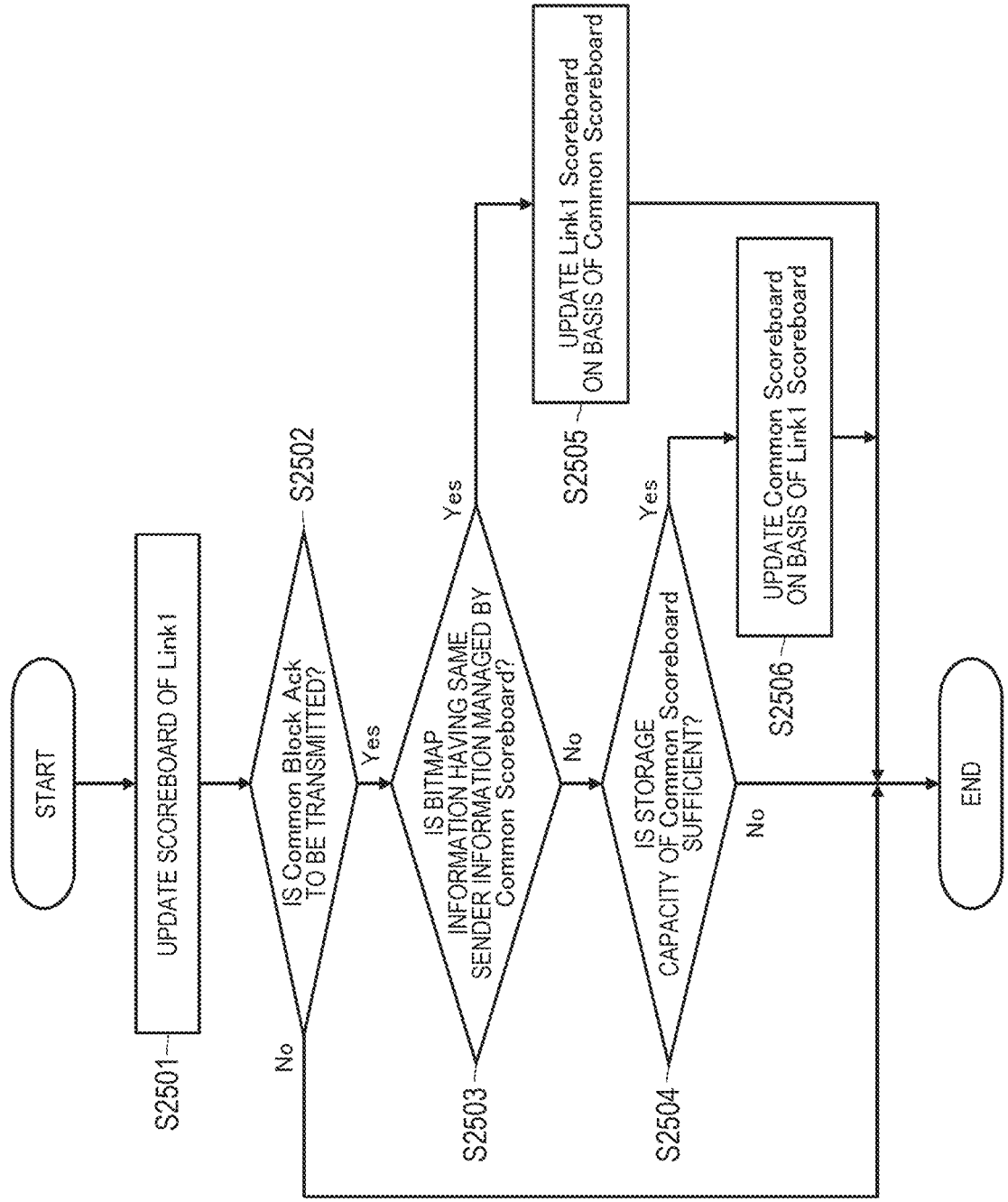
FIG. 25 is a flowchart illustrating a processing procedure (second example) performed by an AP in a Data Transmission phase.

FIG. 25 illustrates, as a flowchart, a processing procedure when the AP receives data in a Data Transmission phase.

The AP receives a data signal on a certain link (for example, Link1), and updates the Link Scoreboard of the Link MAC entity corresponding to the link on the basis of data acquisition success/failure information by the conventional method (step S2501).

Next, the AP checks whether to transmit Common Block Ack (step S2502). Specifically, the AP checks whether the Block Ack Setup including the Common Block Ack has been completed with the STA that is a data sender (originator), and the Ack Policy in the MAC Header/QoS Control field of a received packet is "Common BA".

In a case where the Block Ack setup has not been completed with the data sender or the Ack Policy in the MAC Header/QoS Control field of the received packet is not "Common BA" (No in step S2502), the AP ends this processing without updating the Common Scoreboard.

On the other hand, in a case where the Block Ack setup has been completed with the data sender and the Ack Policy in the MAC Header/QoS Control field of the received packet is "Common BA" (Yes in step S2502), the AP determines whether or not to update the scoreboard.

As the determination as to whether or not to update the scoreboard, the AP first checks whether or not the Link Scoreboard of the link on which data has been received and the Common Scoreboard manage the bitmap having the same sender and the same TID (step S2503).

In a case where the Link Scoreboard of the link (for example, Link) on which data has been received and the Common Scoreboard manage the bitmap having the same sender and the same TID (Yes in step S2503), the AP updates the bitmap information of the Link Scoreboard of the link on which data has been received on the basis of the bitmap information of the Common Scoreboard (step S2505), and ends this present processing. As a result, the acquisition success/failure information of data received with the same sender and the same TID is sequentially updated in the Link Scoreboard of the link (for example, Link1) on which data has been received.

Alternatively, in a case where the Link Scoreboard of the link (for example, Link1) on which data has been received and the Common Scoreboard do not manage the bitmap having the same sender and the same TID (No in step S2503), the AP further checks whether or not the storage capacity of the Common Scoreboard is sufficient (step S2504).

In a case where the storage capacity of the Common Scoreboard is not sufficient (No in step S2504), the AP ends this processing without updating the Common Scoreboard.

On the other hand, in a case where the storage capacity of the Common Scoreboard is sufficient (Yes in step S2505), the AP updates the Common Scoreboard on the basis of the bitmap information of the Link1 Scoreboard (step S2506).

As a result, as long as the storage capacity is sufficient, the acquisition success/failure information of the data received with a new sender or a new TID is updated in the Common Scoreboard.

Figure 26:
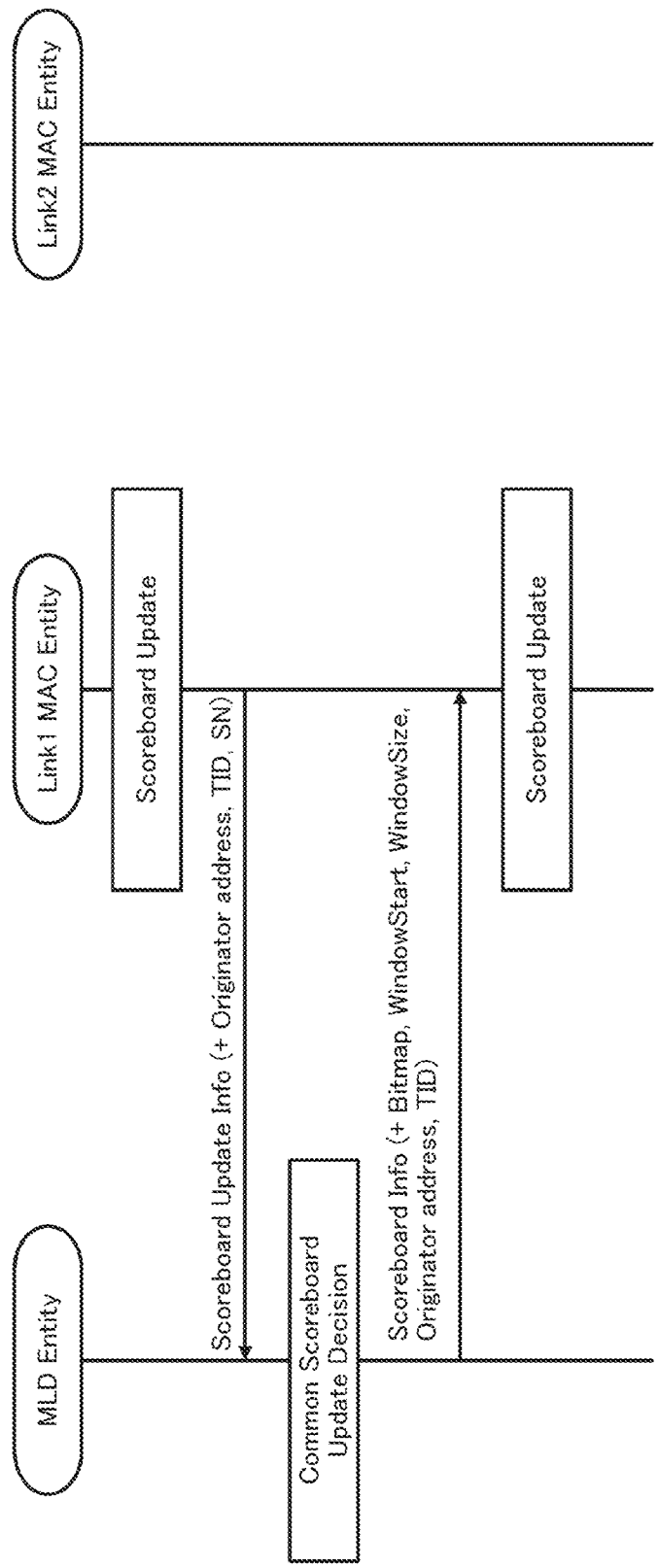
FIG. 26 is a diagram illustrating an example of an internal sequence when the AP receives a data signal in the Data Transmission phase.

FIG. 26 is a diagram illustrating an example of an internal sequence when the AP receives a data signal in the Data Transmission phase. FIG. 26 illustrates an example of an internal sequence corresponding to step S2505 in the flowchart illustrated in FIG. 25 when the bitmap information of the Common Scoreboard is updated on the basis of the bitmap information of the Link1 MAC Scoreboard. The AP is an MLO-compatible communication device, that is, an MLD, and includes the Link1 MAC Entity and the Link2 MAC Entity that perform individual data processing for each link and the MLD Entity that performs data processing common to all links as illustrated in FIG. 3. In addition, as scoreboards for storing data acquisition success/failure information in the AP, the Link1 Scoreboard and the Link2 Scoreboard included in the Link1 MAC Entity and the Link2 MAC Entity, respectively, and the Common Scoreboard included in the MLD Entity are provided.

When the Link1 MAC Entity updates the Link1 Scoreboard in response to the data being received on the Link1 (Scoreboard Update), the Link1 MAC Entity notifies the MLD Entity of Scoreboard Update Info including Originator Address, TID, and Updated SN.

The MLD Entity determines whether the bitmap information having the same sender information (that is, the same Originator Address and the same TID) is managed by the Common Scoreboard on the basis of the information acquired from the Link1 MAC Entity (Common Scoreboard Update Decision). This determination process corresponds to step S2503 in the flowchart illustrated in FIG. 25. Here, it is assumed that Block Ack setup is completed with the STA that is a data sender (originator), and Ack Policy in the MAC Header/QoS Control field of the received packet specifies "Common BA".

Then, when checking that the bitmap information having the Originator Address and the TID that are the same as those of the Link1 Scoreboard is managed by the Common Scoreboard, the MLD Entity determines to update the Link1 Scoreboard. In this case, the MLD Entity transmits Scoreboard Info including bitmap information, WindowStart, WindowSize, Originator Address, and TID to the Link1 MAC Entity.

The Link1 MAC entity updates the Link Scoreboard on the basis of the information included in the Common Scoreboard acquired from the MLD Entity (Scoreboard Update). The Link1 MAC Entity updates the Link1 Scoreboard in accordance with the following procedure.

(1) WindowEnd$_{RL1}$=max(WindowEnd$_{RL1}$, WindowEnd$_{Rc}$) is set. That is, the Link1 Scoreboard is updated in accordance with one of the Link1 Scoreboard and the Link2 Scoreboard with a larger end value of the sequence number to be stored.

(2) WindowStart$_{RL1}$=WindowEnd$_{RL1}$−WindowSize$_{RL1}$+1 is set.

(3) In each SN from WindowStart$_{Rc}$ to WindowEnd$_{Rc}$, "1" is set to Link1 Scoreboard indicated by SN in which the bitmap information of the Common Scoreboard is "1".

Figure 27:
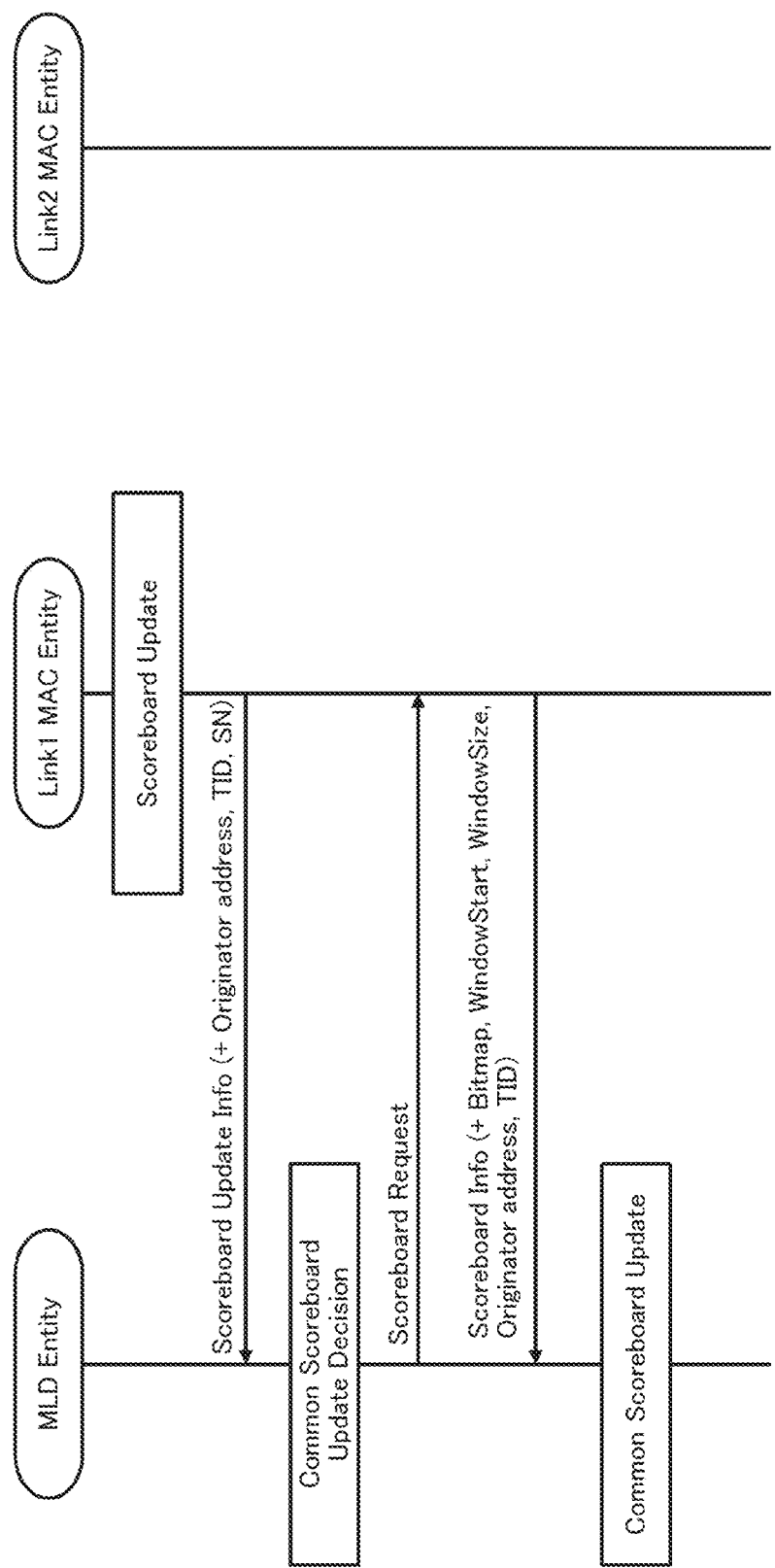
FIG. 27 is a diagram illustrating another example of the internal sequence when the AP receives the data signal in the Data Transmission phase.

FIG. 27 illustrates another example of the internal sequence when the AP receives a data signal in the Data Transmission phase. FIG. 27 illustrates an example of an internal sequence corresponding to step S2506 in the flowchart illustrated in FIG. 25 when the bitmap information of the Link Scoreboard is updated on the basis of the bitmap information of the Common MAC Scoreboard.

When the Link1 MAC Entity updates the Link1 Scoreboard in response to the data being received on the Link1 (Scoreboard Update), the Link1 MAC Entity notifies the MLD Entity of Scoreboard Update Info including Originator Address, TID, and Updated SN.

The MLD Entity determines whether the bitmap information having the same sender information (that is, the same Originator Address and the same TID) is managed by the Common Scoreboard on the basis of the information acquired from the Link1 MAC Entity (Common Scoreboard Update Decision).

Then, when checking that the Common Scoreboard and the Link1 Scoreboard do not manage bitmap information having the same Originator Address and the same TID and that the storage capacity of the Common Scoreboard is sufficient, the MLD Entity determines to update the Common Scoreboard. In this case, the MLD entity transmits Scoreboard Request to the Link1 MAC Entity.

The Link1 MAC Entity transmits Scoreboard Info including bitmap information, WindowStart, WindowEnd, Originator Address, and TID in response to the Scoreboard Request from the MLD Entity.

Then, the MLD entity updates the Common Scoreboard in accordance with the following procedure on the basis of the Scoreboard Info collected from the Link1 MAC Entity and the Link2 MAC Entity (Common Scoreboard Update).

(1) $WindowEnd_{Rc}$=SN is set.

(2) $WindowStart_{Rc}$=$WindowEnd_{Rc}$−$WindowSize_{Rc}$+1 is set.

(3) A bitmap of the size of $WindowSize_{Rc}$ is created in such a manner that the start is $WindowStart_{Rc}$ and the end is $WindowEnd_{Rc}$ (0 is input at first).

(4) "1" is set in the portion indicated by SN of bitmap information of the Common Scoreboard.

Figure 28:
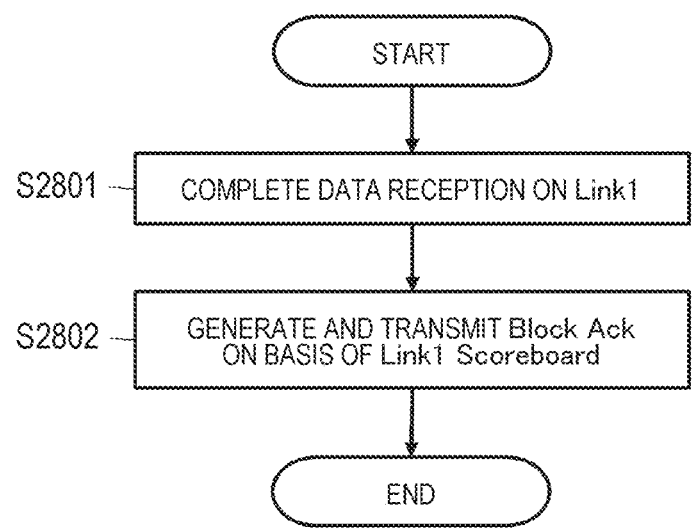
FIG. 28 is a flowchart illustrating a processing procedure (second example) for the AP to transmit Block Ack.

FIG. 28 illustrates, as a flowchart, a processing procedure for the AP to transmit Block Ack.

When completing the reception of a data signal on a certain link (for example, Link1) (step S2801), the AP generates Block Ack on the basis of the information of the Link Scoreboard of the link (for example, Link1) on which the data signal has been received, transmits the Block Ack to a STA, which is a sender, (step S2802), and ends this processing.

According to the processing procedure illustrated in FIG. 28, the acquisition success/failure information of packets from the same sender and the same TID is sequentially updated in the Link Scoreboard of the link on which data has been received. Therefore, in step S2802 described above, the AP can generate and transmit Common Block Ack.

Figure 29:
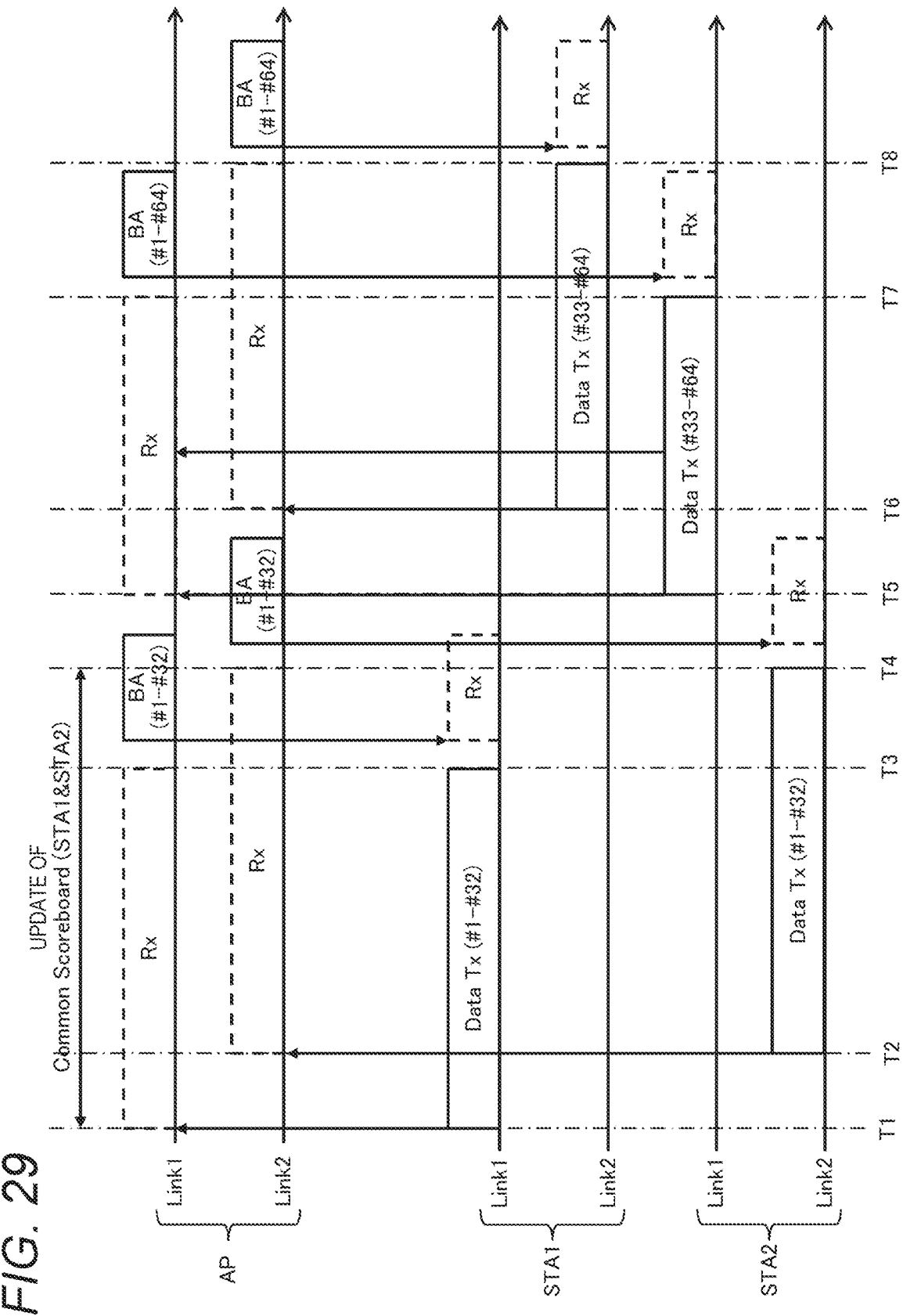
FIG. 29 is a diagram illustrating still another example (second example) of the communication sequence of the multi-link operation.

FIG. 29 illustrates an example of a communication sequence of the multi-link operation performed in the communication system illustrated in FIG. 1. In the example of the communication sequence illustrated in FIG. 29, as in FIG. 23, both the TA1 and the STA2 transmit data to the AP using the Link1 and the Link2, and the data transmission start time and the data transmission end time are reversed between the STA1 and the STA2.

Note that the horizontal axis in FIG. 29 is a time axis, and indicates a communication operation at each time on each link of the AP, the STA1, and the STA2. The square block drawn by a solid line represents a transmission frame at a corresponding communication device, link, and time, the arrow in a vertical solid line indicates frame transmission to a destination, and the square block drawn by a dotted line represents a reception frame.

Figure 30:
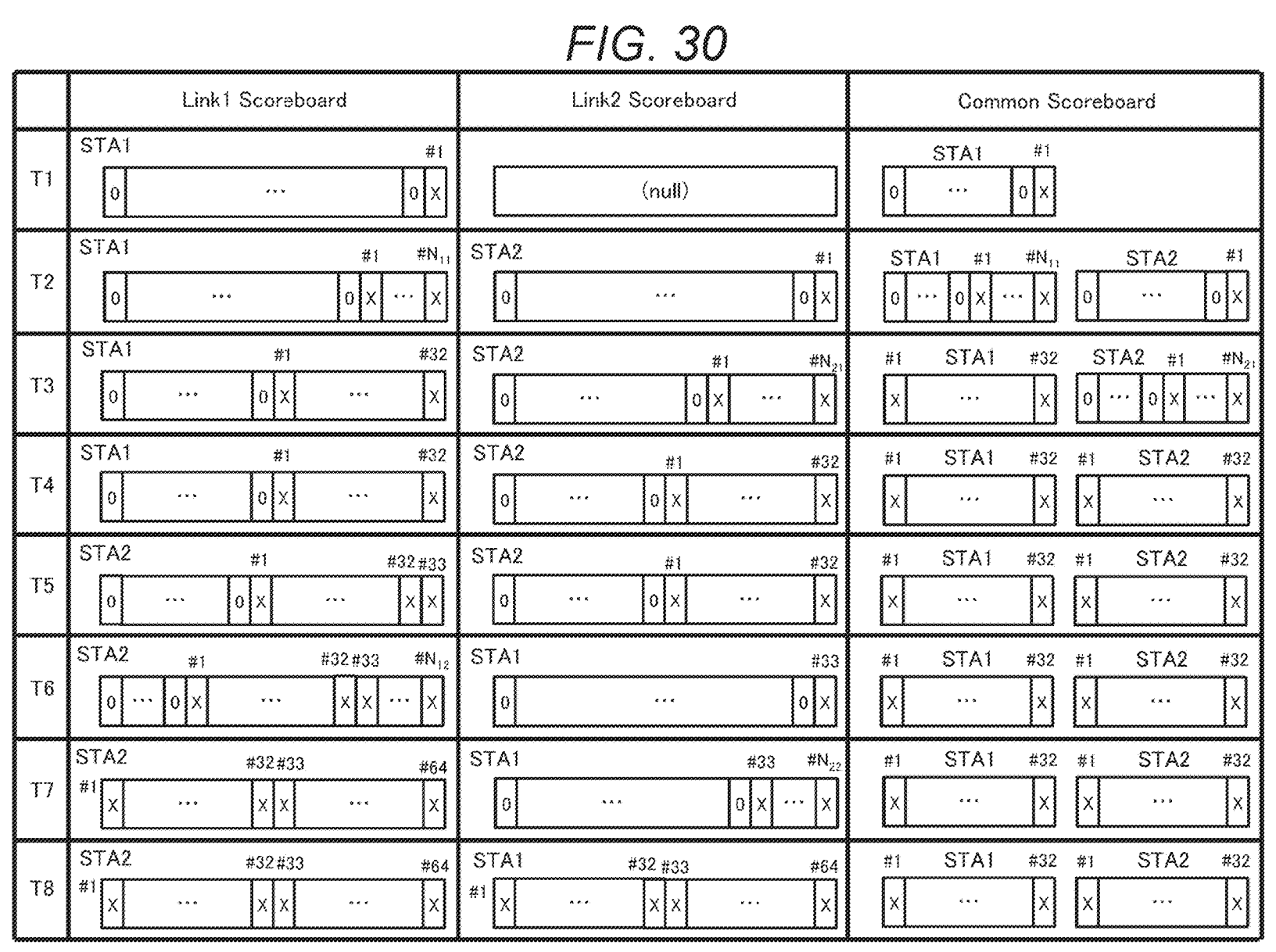

Furthermore, FIG. 30 illustrates notation of bitmap information at each time of Link1 MAC Entity and Common Scoreboard of each link in the AP when the communication sequence illustrated in FIG. 29 is performed. Information matching SN indicated by $WindowStart_R$ is stored at the left end of the bitmap information of each scoreboard, and information matching SN indicated by $WindowEnd_R$ is stored at the right end. At each bit position on the bitmap, acquisition success/failure information of the packet with the corresponding SN is represented by 0 and 1. The SN of the packet that has not yet been received is represented by "0". In addition, the SN of the already acquired packet is represented by "X", and either 0 or 1 is stored in X depending on the success or failure of the acquisition of the packet.

Generally, the TID value also relates to the management of the scoreboard, but here, in order to simplify the description, it is assumed that only data of the same TID is transmitted. In addition, it is assumed that WindowSize=64, and packets with SN of #1 to #32 are transmitted on the Link1 and data with SN of #33 to #64 is transmitted on the Link2 in both the STA1 and the STA2. However, the present disclosure is not limited to the above assumption, and for example, different numbers of packets may be included in the Link1 and the Link2, or packets whose number is less than WindowSize may be transmitted.

Hereinafter, the communication sequence illustrated in FIG. 29 will be described with reference to the status of each scoreboard illustrated in FIG. 30.

When acquiring the transmission right of the Link1 at time T1, the STA1 starts to transmit a data signal obtained by aggregating the packets with SN #1 to #32, and completes the transmission of the aggregated data signal at time T3. During the period from the time T1 to the time T3, bitmap information related to the success/failure of acquisition of the packets with SN #1 to #32 transmitted from the STA1 is stored in the Link1 Scoreboard and is sequentially updated.

During the period from the time T1 to the time T3, the memory capacity of the Common Scoreboard is sufficient, and thus bitmap information related to the success/failure of acquisition of the packets with SN 1 to #32 transmitted from the STA1 on the Link1 is stored in the Common Scoreboard and is sequentially updated.

When acquiring the transmission right of the Link2 at the time T2, the STA2 starts to transmit the data signal obtained by aggregating the packets with SN #1 to #32, and completes the transmission of the aggregated data signal at the time T4. During the period from the time T2 to the time T4, bitmap information related to the success/failure of acquisition of the packets with SN 1 to #32 transmitted from the STA2 is stored in the Link2 Scoreboard and is sequentially updated.

During the period from the time T2 to the time T4, the Common Scoreboard manages the bitmap information of the STA1 that is a different sender from the Link2 Scoreboard but the memory capacity is sufficient, and thus bitmap information related to the success/failure of acquisition of the packets with SN #1 to #32 transmitted from the STA2 on the Link2 is also stored in the Common Scoreboard, and is sequentially updated.

Further, the STA2 acquires the transmission right of the Link1 at time T5. That is, at the time T5, the sender on the Link1 changes from the STA1 to the STA2. The STA2 starts to transmit a data signal obtained by aggregating the packets with the same TID as the Link2 and with SN #33 to #64, and completes the transmission of the aggregated data signal at time T7. After the time T5, the bitmap information related to the success/failure of acquisition of the packets with SN #33 to #64 transmitted from the STA2 is stored in the Link1 Scoreboard and is sequentially updated.

During the period from the time T5 to the time T7, the Common Scoreboard manages the bitmap information of the STA2 that is the same sender as the Link1 Scoreboard, and thus the bitmap information of the Link1 Scoreboard is updated on the basis of the Common Scoreboard. Therefore, at the time T7 when the data transmission by the STA2 on the Link1 ends, the bitmap information (that is, acquisition success/failure information of the sender and the TID that have completed transmission) related to the success/failure of acquisition of the packets with SN #1 to #64 transmitted from the STA2 on the Link1 and the Link2 is stored in the Link1 Scoreboard. As a result, in accordance with the Block Ack transmission procedure illustrated in FIG. 28, the AP can transmit the Common Block Ack to the STA2 on the Link1 on the basis of the bitmap information stored in the Link1 Scoreboard.

Further, the STA1 acquires the transmission right of the Link2 at time T6. That is, at the time T6, the sender on the Link2 changes from the STA2 to the STA1. The STA1 starts to transmit the data signal obtained by aggregating the packets with the same TID as the Link1 and with SN #33 to #64, and completes the transmission of the aggregated data signal at time T8. After the time T6, the bitmap information related to the success/failure of acquisition of the packets with SN #33 to #64 transmitted from the STA1 is stored in the Link1 Scoreboard and is sequentially updated.

At this point, the Common Scoreboard manages the bitmap information of the STA1 that is the same sender as the Link2 Scoreboard, and thus the bitmap information of the Link2 Scoreboard is updated on the basis of the Common Scoreboard. As a result, at the time T8 when the data transmission by the STA2 on the Link1 ends, the bitmap information (that is, acquisition success/failure information of the sender and the TID that have completed transmission) related to the success/failure of acquisition of the packets with SN #1 to #64 transmitted from the STA1 on the Link1 and the Link2 is stored in the Link2 Scoreboard. As a result, in accordance with the Block Ack transmission procedure illustrated in FIG. 28, the AP can transmit the Common Block Ack to the STA1 on the Link2 on the basis of the bitmap information stored in the Link2 Scoreboard.

G. EFFECTS

In this section, effects obtained by the present disclosure will be summarized.

(1) The MLO-compatible communication device to which the present disclosure is applied includes Link Scoreboard that manages acquisition success/failure information of a received packet for each link and Common Scoreboard that manages acquisition success/failure information of received packets on a plurality of links. Although the Common Scoreboard is managed as a cache type, Common Block Ack including acquisition success/failure information of received packets on a plurality of links can be transmitted with high reliability, and the Common Scoreboard can be mounted in an inexpensive memory.

(2) The communication device to which the present disclosure is applied exchanges Capability information indicating whether or not it is possible to manage acquisition success/failure information of received packets on a plurality of links using the Common Scoreboard with another communication device. Therefore, the data sender can correctly set Ack Policy by determining whether or not the Common Block Ack can be generated on a reception side.

(3) According to the present disclosure, the data sender adds and transmits information as to whether or not to update the Common Scoreboard in response to Block Ack Request. Therefore, the reception side can update the Common Scoreboard simultaneously with the Link Scoreboard.

(4) The MLO-compatible communication device to which the present disclosure is applied updates the Link Scoreboard on the basis of the information of the Common Scoreboard. Therefore, even in a situation in which a plurality of data senders alternately transmits data using a plurality of links, it is possible to generate and transmit the Common Block Ack.

INDUSTRIAL APPLICABILITY

The present disclosure has been described in detail above with reference to specific embodiments. However, it is obvious that those skilled in the art can make modifications and substitutions of the embodiments without departing from the gist of the present disclosure.

For example, by applying the present disclosure to a wireless LAN system in accordance with the IEEE 802.11 standard, as a matter of course, even by applying the present disclosure to a wireless system that performs multi-link communication in accordance with another communication standard, similar effects can be obtained.

In short, the present disclosure has been described by way of exemplification, and the contents described in the present specification should not be interpreted in a limited manner. In order to determine the gist of the present disclosure, the claims should be taken into consideration.

Note that the present disclosure can have the following configurations.

(1) A communication device that performs wireless communication using a plurality of links, the communication device including:

a common data processing unit that includes a common storage unit of a cache type storing success/failure of acquisition of packets received on the plurality of links, and that performs common data processing on packets received on individual links; and a control unit that controls transmission of a response signal to the packets received, in which the control unit generates a common response signal including acquisition success/failure information received on the plurality of links on the basis of acquisition success/failure information held in the common storage unit.

(2) The communication device according to (1), further including an individual data processing unit that includes an individual storage unit storing acquisition success/failure information of packets received on individual links, and that performs individual data processing on the packets received on the individual links.

(3) The communication device according to (2), in which the control unit performs update processing of the common storage unit on the basis of acquisition success/failure information related to same sender information stored in the common storage unit and the individual storage unit.

(4) The communication device according to (3), in which in a case where the individual storage unit stores acquisition success/failure information related to same sender information as the common storage unit, the control unit performs update processing of the common storage unit on the basis of acquisition success/failure information related to the same sender information stored in the individual storage unit.

(5) The communication device according to (3) or (4), in which in a case where the individual storage unit does not store acquisition success/failure information related to same sender information as the common storage unit, but individual storage units on a plurality of links store acquisition success/failure information related to same sender information, the control unit performs update processing of the common storage unit on the basis of the acquisition success/failure information related to the same sender information stored in the individual storage units on the plurality of links.

(6) The communication device according to (5), in which the control unit performs update processing of the common storage unit in accordance with a larger end value of sequence numbers stored in individual storage units on the plurality of links.

(7) The communication device according to (5) or (6), in which at a sequence number indicating successful acquisition in at least one of individual storage units on the plurality of links, the control unit sets a value indicating successful acquisition also in acquisition success/failure information of the common storage unit.

(8) The communication device according to any one of (1) to (7), in which the control unit performs control in such a manner that information indicating whether or not the common storage unit can be managed is exchanged with a packet sender.

(9) The communication device according to (8), in which in a case where it has been checked with a sender that the common storage unit can be managed, and transmission of the common response signal is requested with a header of a data signal received, the control unit tries to update the common storage unit.

(10) The communication device according to any one of (1) to (9), in which the control unit determines whether or not to generate the common signal on the basis of sender information managed by the common storage unit.

(11) The communication device according to (10), in which in a case where the common storage unit stores acquisition success/failure information related to same sender information as a packet completely received, the control unit generates the common response signal on the basis of acquisition success/failure information stored in the common storage unit, whereas in a case where the common storage unit does not store the acquisition success/failure information related to the same sender information as the packet completely received, the control unit generates the individual response signal on the basis of acquisition success/failure information stored in an individual storage unit of a link on which the packet has been received.

(12) The communication device according to any one of (1) to (11), in which the control unit determines whether or not to update the common storage unit on the basis of information included in a response request signal received from a sender.

(13) The communication device according to (2), in which the control unit performs update processing of the individual storage unit on the basis of acquisition success/failure information related to same sender information stored in the common storage unit and the individual storage unit.

(14) A communication method that performs wireless communication using a plurality of links, the communication method including:

a common data processing step of performing common data processing on packets received on individual links using a common storage unit of a cache type storing success/failure of acquisition of packets received on the plurality of links; and a control step of controlling transmission of a response signal to the packets received, in which in the control step, on the basis of acquisition success/failure information held in the common storage unit, a common response signal including acquisition success/failure information received on the plurality of links is generated.

(15) A communication device including:

a communication unit that performs wireless communication using a plurality of links; and a control unit that controls a wireless communication operation in the communication unit, in which when transmitting data signals on the plurality of links, the control unit provides notification of presence or absence of a request for a common response signal including acquisition success/failure information related to reception of data signals on the plurality of links.

(16) The communication device according to (15), in which the control unit performs control so as to transmit a response request signal requesting transmission of the common response signal.

(17) The communication device according to (16), in which the control unit performs control so as to transmit the response request signal in order to initialize a common storage unit that stores acquisition success/failure information related to reception of data signals on the plurality of links.

(18) A communication method that performs wireless communication using a plurality of links, the communication method including:

a step of providing notification of presence or absence of a request for a common response signal including acquisition success/failure information related to reception of data signals on the plurality of links and transmitting a data signal; and a step of receiving a response signal.

REFERENCE SIGNS LIST

200 Communication device
210 Communication unit
211 Communication control unit
212 Communication storage unit
213 Common data processing unit
214 Individual data processing unit
215 Signal processing unit
216 Wireless interface unit
217 Amplification unit
220 Control unit
230 Storage unit
240 Antenna

The invention claimed is:

1. A communication device that performs wireless communication using a plurality of links, the communication device comprising:

a transceiver; and
control circuitry that:
receives packets on individual links of the plurality of links from a plurality of senders, stores information about an acquisition success/failure of the packets received on the individual links of the plurality of links in individual storages that are link specific, determines whether or not a block acknowledgement policy has been set for a specific sender of the plurality of senders, and upon determining that the block acknowledgement policy for the specific sender has been set:
- determines whether or not any of the packets received on the individual links of the plurality of links are from the specific sender, and
- only for the packets received on the individual links of the plurality of links that are from the specific sender:
  - retrieves corresponding acquisition success/failure information from the individual storages,
  - stores the corresponding acquisition success/failure information in a common storage of a cache type,
  - upon determining that receipt of the packets from the specific sender on the individual links of the plurality of links has ended, generates a block acknowledgement signal that includes the information about the success/failure of the acquisition of the block of packets from the specific sender, and
  - transmits the block acknowledgement signal on one of the individual links of the plurality of links.

2. The communication device according to claim 1, wherein
the control circuitry performs update processing of the common storage in accordance with a larger end value of sequence numbers stored in individual storage units on the plurality of links.

3. The communication device according to claim 1, wherein
at a sequence number indicating successful acquisition in at least one of individual storage units on the plurality of links, the control circuitry sets a value indicating successful acquisition also in acquisition success/failure information of the common storage.

4. A communication method of a communication device that performs wireless communication using a plurality of links, the communication method comprising:
receiving packets on individual links of the plurality of links from a plurality of senders,
storing information about an acquisition success/failure of the packets received on the individual links of the plurality of links in individual storages that are link specific,
determining whether or not a block acknowledgement policy has been set for a specific sender of the plurality of senders, and
upon determining that the block acknowledgement policy for the specific sender has been set:
- determining whether or not any of the packets received on the individual links of the plurality of links are from the specific sender, and
- only for the packets received on the individual links of the plurality of links that are from the specific sender:
  - retrieving corresponding acquisition success/failure information from the individual storages,
  - storing the corresponding acquisition success/failure information in a common storage of a cache type,
  - upon determining that receipt of the packets from the specific sender on the individual links of the plurality of links has ended, generating a block acknowledgement signal that includes the information about the success/failure of the acquisition of the block of packets from the specific sender, and
  - transmitting the block acknowledgement signal on one of the individual links of the plurality of links.

5. A non-transitory computer product containing instructions that cause a processor of a communication device to perform a wireless communication method using a plurality of links, the communication method comprising:
receiving packets on individual links of the plurality of links from a plurality of senders,
storing information about an acquisition success/failure of the packets received on the individual links of the plurality of links in individual storages that are link specific,
determining whether or not a block acknowledgement policy has been set for a specific sender of the plurality of senders, and
upon determining that the block acknowledgement policy for the specific sender has been set:
- determining whether or not any of the packets received on the individual links of the plurality of links are from the specific sender, and
- only for the packets received on the individual links of the plurality of links that are from the specific sender:
  - retrieving corresponding acquisition success/failure information from the individual storages,
  - storing the corresponding acquisition success/failure information in a common storage of a cache type,
  - upon determining that receipt of the packets from the specific sender on the individual links of the plurality of links has ended, generating a block acknowledgement signal that includes the information about the success/failure of the acquisition of the block of packets from the specific sender, and
  - transmitting the block acknowledgement signal on one of the individual links of the plurality of links.

* * * * *